United States Patent
Okuda et al.

(10) Patent No.: US 8,164,982 B2
(45) Date of Patent: Apr. 24, 2012

(54) ULTRASONIC SENSOR WITH PIEZOELECTRIC ELEMENTS AND ACOUSTIC MATCHING MEMBERS

(75) Inventors: Yasuyuki Okuda, Aichi-gun (JP); Takaaki Kawai, Obu (JP); Makiko Sugiura, Hekinan (JP); Takayuki Ishikawa, Anjo (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 13/158,006

(22) Filed: Jun. 10, 2011

(65) Prior Publication Data
US 2011/0261651 A1    Oct. 27, 2011

Related U.S. Application Data

(62) Division of application No. 12/318,187, filed on Dec. 23, 2008, now Pat. No. 8,009,518.

(30) Foreign Application Priority Data

| Dec. 26, 2007 | (JP) | ................................. | 2007-334112 |
| Feb. 22, 2008 | (JP) | ................................. | 2008-41215 |
| Apr. 9, 2008 | (JP) | ................................. | 2008-101302 |
| May 23, 2008 | (JP) | ................................. | 2008-135579 |
| Oct. 28, 2008 | (JP) | ................................. | 2008-276998 |

(51) Int. Cl.
*G01S 15/00* (2006.01)
*G10K 11/00* (2006.01)
*G01V 1/16* (2006.01)

(52) U.S. Cl. .......... 367/99; 367/152; 367/165; 367/173; 367/188

(58) Field of Classification Search ...................... 367/99
See application file for complete search history.

(56) References Cited

U.S. PATENT DOCUMENTS

| 3,521,090 A | 7/1970 | Angeloff |
| 4,326,275 A | 4/1982 | Butler |
| 4,463,454 A | 7/1984 | Hemond et al. |
| 5,018,116 A * | 5/1991 | Congdon ...................... 367/165 |
| 5,115,809 A | 5/1992 | Saitoh et al. |

(Continued)

FOREIGN PATENT DOCUMENTS

JP    A-1-077299    3/1989

(Continued)

OTHER PUBLICATIONS

Office Action mailed Jan. 12, 2010 issued from the Japan Patent Office in the corresponding patent application No. 2008-276998 (and English translation).

(Continued)

*Primary Examiner* — Thomas Tarcza
*Assistant Examiner* — James Hulka
(74) *Attorney, Agent, or Firm* — Posz Law Group, PLC

(57) ABSTRACT

An ultrasonic sensor includes a transmitting device, receiving devices arranged in an array, and a circuit device. One receiving device is configured as a reference receiving device. The circuit device includes a reference signal generator and first and second synchronous detectors. The reference signal generator generates a reference signal by using a received signal of the reference receiving device. The first synchronous detector performs synchronous detection of a received signal of one of the receiving devices based on the reference signal to detect a distance to an object. The second synchronous detector performs synchronous detection of received signals of the receiving devices except the reference receiving device based on the reference signal to detect a direction of the object.

8 Claims, 31 Drawing Sheets

U.S. PATENT DOCUMENTS

| | | | |
|---|---|---|---|
| 5,159,580 A | | 10/1992 | Andersen et al. |
| 5,491,671 A | * | 2/1996 | Potter .......................... 367/158 |
| 5,553,035 A | | 9/1996 | Seyed-Bolorforosh et al. |
| 5,712,447 A | * | 1/1998 | Hanson ........................ 114/20.1 |
| 5,714,713 A | * | 2/1998 | Hanson ........................ 114/20.1 |
| 5,878,000 A | | 3/1999 | Dubois |
| 5,907,521 A | | 5/1999 | Matsui et al. |
| 5,995,453 A | | 11/1999 | Hirata |
| 6,088,894 A | | 7/2000 | Oakley et al. |
| 6,205,226 B1 | | 3/2001 | Senoo et al. |
| 7,522,475 B2 | | 4/2009 | Kojima et al. |
| 7,525,237 B2 | | 4/2009 | Sugiura et al. |
| 7,540,194 B2 | | 6/2009 | Sugiura et al. |
| 7,693,007 B2 | | 4/2010 | Sugiura et al. |
| 7,696,672 B2 | | 4/2010 | Sugiura et al. |
| 7,712,368 B2 | | 5/2010 | Sugiura et al. |
| 7,714,482 B2 | | 5/2010 | Okuda et al. |
| 7,726,192 B2 | | 6/2010 | Okuda |
| 7,775,110 B2 | | 8/2010 | Okuda et al. |
| 7,781,938 B2 | | 8/2010 | Sugiura et al. |
| 7,821,872 B2 | | 10/2010 | Okuda |
| 2003/0121331 A1 | | 7/2003 | Mitsuoka et al. |
| 2004/0193050 A1 | * | 9/2004 | Ogawa .......................... 600/438 |
| 2006/0082617 A1 | * | 4/2006 | Nagashima ..................... 347/68 |
| 2006/0132262 A1 | * | 6/2006 | Fazzio et al. .................. 333/187 |
| 2008/0015443 A1 | | 1/2008 | Hosono et al. |
| 2008/0083282 A1 | | 4/2008 | Okuda |
| 2008/0232197 A1 | * | 9/2008 | Kojima et al. ................... 367/99 |
| 2009/0168603 A1 | | 7/2009 | Okuda et al. |

FOREIGN PATENT DOCUMENTS

| | | |
|---|---|---|
| JP | U-2-35085 | 3/1990 |
| JP | A-H04-157360 | 5/1992 |
| JP | A-2000-253496 | 9/2000 |
| JP | A-2002-318223 | 10/2002 |
| JP | A-2004-056352 | 2/2004 |
| JP | A-2004-120320 | 4/2004 |
| JP | A-2007-158240 | 6/2007 |
| JP | A-2007-170975 | 7/2007 |
| JP | A-2007-334112 | 12/2007 |

OTHER PUBLICATIONS

Final Office Action mailed Apr. 27, 2010 issued from the Japan Patent Office in the corresponding patent application No. 2008-135579 (and English translation).

Office Action dated Oct. 14, 2010 issued from the German Patent Office in corresponding DE application No. 10 2008 054 533.3 (and English translation).

Benjamin, K.C.; Walden, A.K.; Van Buren, A.L. "Design and development of a constant beamwidth transducer for sub-bottom acoustic profiling" Oceans '97. MTS/IEEE Conference Proceedings (0-7803-4108-2) 1997. Vo. 2; p. 1054-1059 vol. 2.

Seyed-Boloforosh, M.S., "Design requirements for an integrated acoustic impedance matching layer" Electronics Letters (0013-5194) 1995. vol. 31, Iss.19; p. 1702-1703.

* cited by examiner

ULTRASONIC SENSOR WITH PIEZOELECTRIC ELEMENTS AND ACOUSTIC MATCHING MEMBERS

CROSS REFERENCE TO RELATED APPLICATIONS

This application is a divisional of U.S. patent application Ser. No. 12/318,187 filed on Dec. 23, 2008 now U.S. Pat. No. 8,009,518 and entitled ULTRASONIC SENSOR WITH PIEZOELECTRIC ELEMENTS AND VIBRATION ISOLATOR, and is based on and incorporates herein by reference Japanese Patent Applications No. 2007-334112 filed on Dec. 26, 2007, No. 2008-41215 filed on Feb. 22, 2008, No. 2008-101302 filed on Apr. 9, 2008, No. 2008-135579 filed on May 23, 2008, and No. 2008-276998 filed on Oct. 28, 2008.

FIELD OF THE INVENTION

The present invention relates to an ultrasonic sensor constructed with multiple sensor devices arranged in an array.

BACKGROUND OF THE INVENTION

An ultrasonic sensor has been proposed that includes multiple sensor devices arranged in an array. For example, such an ultrasonic sensor detects a position (i.e., distance and direction) of an object by calculating a time interval between transmitting an ultrasonic wave and receiving the ultrasonic wave (i.e., echo) reflected from the object and by calculating a phase difference between the ultrasonic waves received by receiving devices.

In an ultrasonic sensor disclosed in JP-A-2007-170975, a synchronous detection of a received signal is performed on each receiving element to detect a phase difference between ultrasonic waves received by the receiving devices. In such an approach, the Doppler effect can be reduced. However, since the synchronous detection is performed on each receiving element, the ultrasonic sensor needs many processing devices. Accordingly, the ultrasonic sensor is increased in size.

In an ultrasonic sensor, a detection error may be caused by a direct wave that is directly received by a receiving device without being reflected by the object. JP-A-2007-170975 discloses a technique for reducing the detection error caused by the direct wave. According to the technique, an electrical signal having an opposite phase to an ultrasonic wave transmitted by a transmitting device is supplied to a detection circuit, which detects an object based on the ultrasonic wave received by a receiving device. The technique may be effective only when the transmitting device and the receiving device are physically separated from each other.

In an ultrasonic sensor disclosed in JP-A-2000-253496, multiple sensor devices are arranged in an array such that a transmitting device and a receiving device are physically joined together through an adhesive. A detection sensitivity of the ultrasonic sensor can be improved by causing the transmitting device to vibrate strongly so as to increase pressure of the ultrasonic wave transmitted by the transmitting device. However, when the transmitting device vibrates strongly to transmit the ultrasonic wave of high pressure, the vibration of the transmitting device is likely to propagate to the receiving device through the adhesive. The vibration propagation from the transmitting device to the receiving device may cause a detection error. The technique disclosed in JP-A-2007-170975 is not effective for reducing the detection error caused by the vibration propagation.

SUMMARY OF THE INVENTION

In view of the above, it is an object of the present invention to provide an ultrasonic sensor constructed with multiple sensor devices arranged in an array and configured to reduce at least one of a Doppler effect, a vibration propagation, and size.

According to a first aspect of the present invention, an ultrasonic sensor for detecting an object includes a transmitting device, multiple receiving devices, and a circuit device. The transmitting device transmits an ultrasonic wave to the object. Each receiving device receives the ultrasonic wave reflected from the object and outputs a received signal corresponding to the received ultrasonic wave. The receiving devices include a reference receiving device and at least one non-reference receiving device. The circuit device is electrically coupled to the receiving devices and processes the received signals of the receiving devices. The circuit device includes a reference signal generator, a first synchronous detector, and a second synchronous detector. The reference signal generator generates a reference signal by using the received signal of the reference receiving device. The first synchronous detector performs synchronous detection of the received signal of one of the reference receiving device and the non-reference receiving device based on the reference signal to detect a time interval between transmitting and receiving the ultrasonic wave. The first synchronous detector calculates a distance to the object based on the detected time interval. The second synchronous detector performs synchronous detection of the received signal of the non-reference receiving device based on the reference signal to detect a phase difference between the received signals of the reference receiving device and the non-reference receiving device. The second synchronous detector calculates a direction of the object based on the phase difference.

According to a second aspect of the present invention, an ultrasonic sensor for detecting an object includes multiple sensing devices arranged in an array and a circuit device. Each sensing device includes a piezoelectric element and an acoustic matching member having a first surface exposed to space where the object exists and a second surface joined to the piezoelectric element. The circuit device is electrically coupled to the piezoelectric element. One of the sensing devices is configured as a transmitting device that transmits an ultrasonic wave upon reception of a transmission signal outputted from the circuit device. At least another one of the sensing devices is configured as a receiving device that receives the ultrasonic wave reflected from the object and outputs a received signal corresponding to the received ultrasonic wave to the circuit device. The circuit device includes a drive signal generator that outputs a drive signal to the receiving device based on the transmission signal. The drive signal causes the piezoelectric element of the receiving device to vibrate such that a vibration propagated from the transmitting device to the receiving device is cancelled.

According to a third aspect of the present invention, an ultrasonic sensor for detecting an object includes multiple sensing devices arranged in an array and a circuit device. Each sensing device include a piezoelectric element and an acoustic matching member having a first surface exposed to space where the object exists and a second surface joined to the piezoelectric element. The circuit device is electrically coupled to the piezoelectric element. A first one of the sensing devices is configured as a transmitting device that transmits an ultrasonic wave upon reception of a transmission signal outputted from the circuit device. A second one of the sensing devices is configured as a dummy device that detects only a vibration signal corresponding to a vibration propagating from the transmitting device to the dummy device. At least another one of the sensing devices is configured as a receiving device that receives the ultrasonic wave reflected from the object and outputs a received signal corresponding to the received ultrasonic wave to the circuit device. The circuit device subtracts the vibration signal from the received signal of the receiving device to cancel a vibration propagated from the transmitting device to the receiving device.

According to a fourth aspect of the present invention, an ultrasonic sensor for detecting a first object includes a transmitting device, a receiving device, a housing, a vibration damper, and a vibration isolator. The transmitting device transmits an ultrasonic wave to the first object. The transmitting device includes a first piezoelectric element for emitting the ultrasonic wave and a first acoustic matching member having a transmitting surface. The emitted ultrasonic wave propagates through the first acoustic matching member and is transmitted through the transmitting surface to the first object. The first piezoelectric element is configured as a multilayer piezoelectric element including multiple piezoelectric layers and multiple electrode layers interleaved with the piezoelectric layers. The receiving device is arranged in an array with the transmitting device and receives the ultrasonic wave reflected from the first object. The receiving device includes a second piezoelectric element for detecting the reflected ultrasonic wave and a second acoustic matching member having a receiving surface. The reflected ultrasonic wave is received through the receiving surface and propagates through the second acoustic matching member to the second piezoelectric element. The housing has an inner space for accommodating the transmitting device and the receiving device. The housing has a bottom and an opening portion. The housing is mountable to a second object at the opening portion. The vibration damper is interposed between the opening portion of the housing and each of the first and second acoustic matching members to fix the first and second acoustic matching members to the housing. Further, the vibration damper is interposed between the first and second acoustic matching members to reduce a propagation of the ultrasonic wave between the first and second acoustic matching members. The vibration isolator partitions the inner space of the housing and is located between the transmitting device and the receiving device to reduce the propagation of the ultrasonic wave between the transmitting device and the receiving device.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENTS

First Embodiment

An ultrasonic sensor 10 according to a first embodiment of the present invention is described below with reference to FIGS. 1A, 1B, and 2. For example, the ultrasonic sensor 10 can be used as an obstacle sensor mounted on a vehicle. An upper direction of FIG. 1B indicates an outside of the vehicle.

Figure 1A:
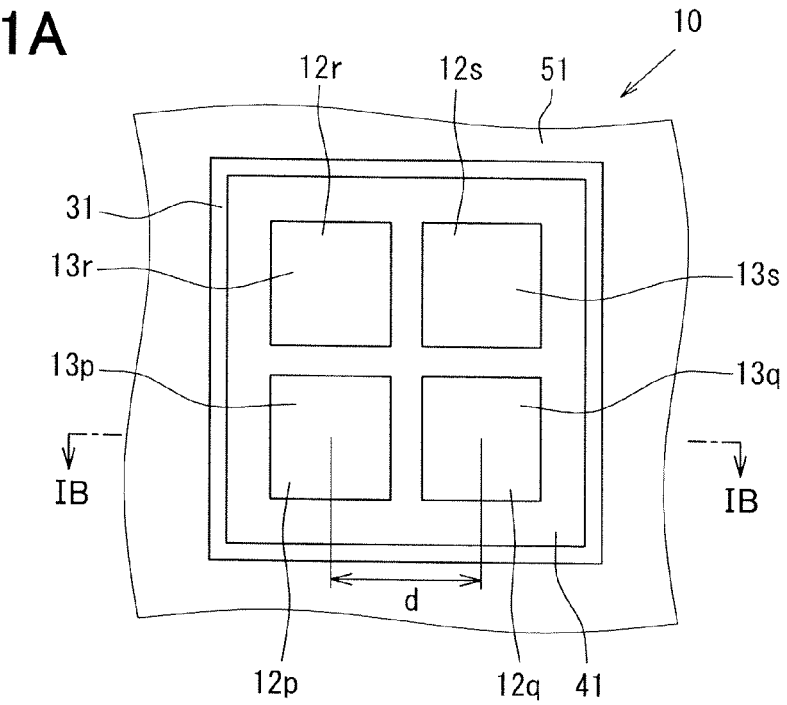
FIG. 1A is a diagram illustrating a top view of an ultrasonic sensor according to a first embodiment of the present invention.
Figure 1B:
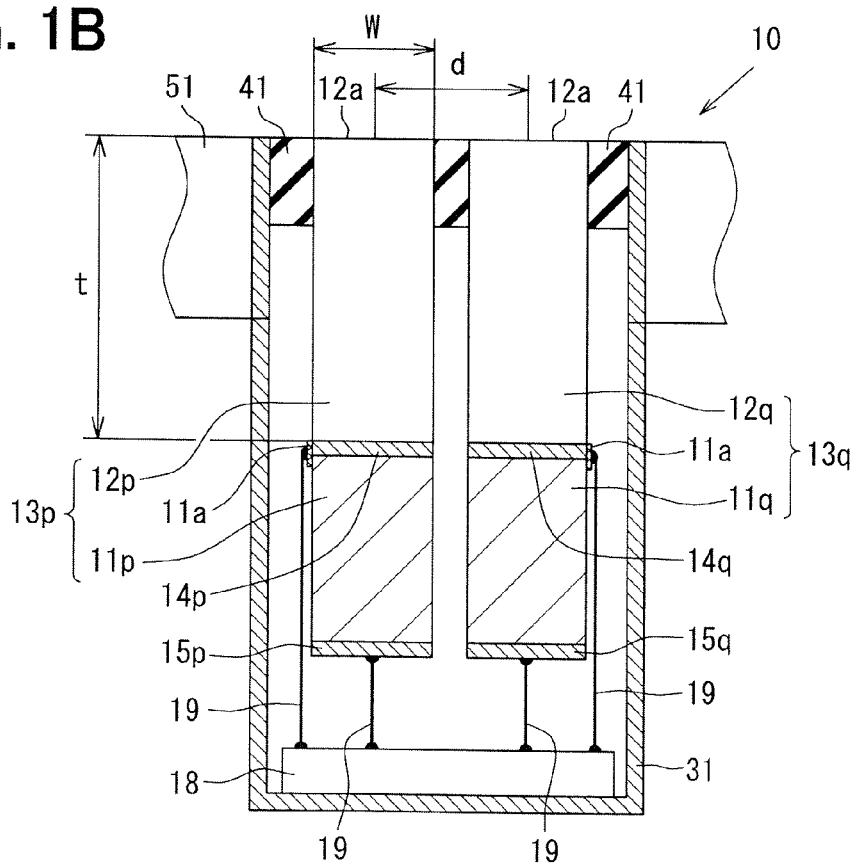
FIG. 1B is a diagram illustrating a cross-sectional view taken along line IB-IB of FIG. 1A.

As shown in FIGS. 1A and 1B, the ultrasonic sensor 10 includes four sensor devices 13p-13s arranged in an array of two rows and two columns, a circuit device 18 electrically coupled to the sensor devices 13p-13s, and a housing 31 for accommodating the sensor devices 13p-13s and the circuit device 18.

The sensor device 13r serves as a transmitting device for transmitting an ultrasonic wave. The sensor device 13q is located diagonally to the transmitting device 13r and serves a reference receiving device. The sensor device 13p is located adjacent to the reference receiving device 13q in a horizontal direction and serves as a receiving device (i.e., non-reference receiving device). The sensor device 13r is located adjacent to the reference receiving device 13q in a vertical direction and serves as a receiving device (i.e., non-reference receiving device).

The ultrasonic sensor 10 is mounted to a bumper 51 of the vehicle and configured to measure a three-dimensional position of an obstacle.

The transmitting device 13r, the reference receiving device 13q, and the receiving devices 13p, 13r are identical in structure. Here, the structure of the receiving device 13p is described. The receiving device 13p includes a piezoelectric element 11p and an acrostic matching member 12p joined to the piezoelectric element 11p. The piezoelectric element 11p can both emit and detect an ultrasonic wave. The acrostic matching member 12p receives the ultrasonic wave reflected from the obstacle and allows the received ultrasonic wave to propagate to the piezoelectric element 11p.

The piezoelectric element 11p can be, for example, piezoelectric zirconate titanate (PZT). The piezoelectric element 11p includes a piezoelectric body and a pair of electrodes 14p, 15p. The piezoelectric body has a rectangular cylindrical shape and is identical in cross-section to the acoustic matching member 12p. The electrodes 14p, 15p are respectively formed on opposite surfaces of the piezoelectric body in an ultrasonic propagation direction. That is, the piezoelectric body is sandwiched between the electrodes 14p, 15p. Specifically, the electrode 14p is formed on the surface facing the acrostic matching member 12p. For example, the electrodes 14p, 15p can be formed by plating or sputtering of platinum (Pt), copper (Cu), or silver (Ag) or by baking of conductive paste.

A wiring portion 11a is formed on a side surface of the piezoelectric element 11p. The wiring portion 11a is electrically coupled to the electrode 14p. Further, the wiring portion 11a is electrically coupled to the circuit device 18 through a wire 19. Thus, the electrode 14p of the piezoelectric element 11p is electrically coupled to the circuit device 18 through the wiring portion 11a and the wire 19. The electrode 15p of the piezoelectric element 11p is electrically coupled to the circuit device 18 through another wire 19.

The acoustic matching member 12p is made of a material having an acoustic impedance that is greater than an acoustic impedance of air and less than an acoustic impedance of the piezoelectric element 11p. For example, the acoustic matching member 12p can be made of a high durability resin material such as a polycarbonate resin.

The acoustic matching members 12p-12s are arranged such that a distance d between centers of adjacent acoustic matching members is substantially equal to one-half the wavelength of the ultrasonic wave. A vibration damper 41 is interposed between an inner wall of the housing 31 and a side surface of each of the acoustic matching members 12p-12s at a position near an exposed surface 12a of each of the acoustic matching members 12p-12s. Further, the vibration damper 41 is interposed between adjacent acoustic matching members 12p-12s. In this way, the acoustic matching members 12p-12s are fixed by the vibration damper 41 to the housing 31 near an opening of the housing 31. The vibration damper 41 damps (i.e., reduces or eliminates) an unwanted vibration propagating from the bumper 51 to the acoustic matching members 12p-12s.

A width w of the cross-section of the acoustic matching member 12p is substantially equal to or less than one-half the wavelength of the ultrasonic wave in air. A thickness t of the acoustic matching member 12p is substantially equal to one-quarter the wavelength of the ultrasonic wave in the acoustic matching member 12p. In such an approach, a standing wave is produced in the acoustic matching member 12p. Thus, interference and cancellation between an ultrasonic wave entering the acoustic matching member 12p and an ultrasonic wave reflected at an interface between the piezoelectric element 11p and the acoustic matching member 12p can be reduced. As a result, the ultrasonic wave entering the acoustic matching member 12p can efficiently propagate to the piezoelectric element 11p.

The circuit device 18 is electrically coupled to an electronic control unit (ECU) of the vehicle. The ECU is not shown in the drawings. When the ultrasonic sensor 10 transmits the ultrasonic wave, the circuit device 18 receives from the ECU a control signal that controls pressure and phase of the ultrasonic wave to be transmitted. The circuit device 18 outputs to the piezoelectric element 11r of the transmitting device 13r a voltage signal according to the control signal. When the ultrasonic sensor 10 receives the ultrasonic wave reflected from the obstacle, the circuit device 18 receives from, for example, the piezoelectric element 11p of the receiving device 13p a voltage signal corresponding to pressure and phase of the received ultrasonic wave. The circuit device 18 generates a vibration signal according to the voltage signal and outputs the vibration signal to the ECU.

Figure 2:
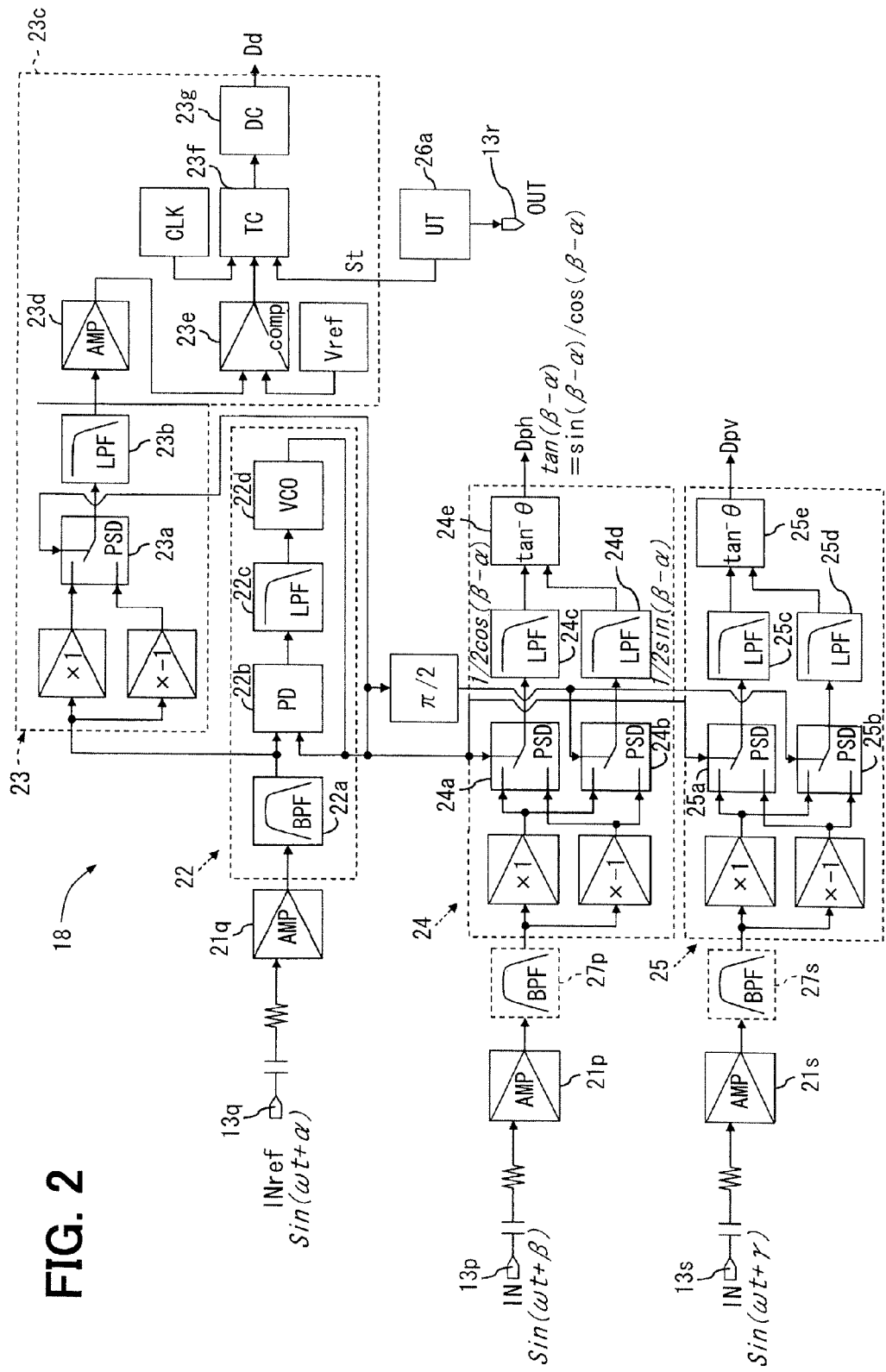
FIG. 2 is a block diagram of a circuit device of the ultrasonic sensor of the first embodiment.

A block diagram of the circuit device 18 is illustrated in FIG. 2. The circuit device 18 includes amplifiers 21q, 21p, 21s, a phase-locked loop (PLL) 22, a distance-information synchronous detector 23, phase-information synchronous detectors 24, 25, and an ultrasonic transmitter 26a. The amplifiers 21q, 21p, 21s amplify received signals of the reference receiving device 13q, the receiving device 13p, and the receiving device 13s, respectively.

The phase-locked loop 22 includes a band-pass filter (BPF) 22a, a phase detector (PD) 22b, a low-pass filter (LPF) 22c, a voltage-controlled oscillator (VCO) 22d. The voltage-controlled oscillator 22d controls a frequency of its output voltage according to its input voltage.

The distance-information synchronous detector 23 performs a synchronous detection of the received signal of the reference receiving device 13q. The distance-information synchronous detector 23 includes a phase sensitive detector (PSD) 23a, a low-pass filter (LPF) 23b, and a distance calculation circuit 23c. The phase sensitive detector 23a has a switch. The distance calculation circuit 23c includes an amplifier 23d, a comparator 23e, a time counter (TC) 23f, and a distance calculator (DC) 23g. The comparator 23e compares an output signal of the amplifier 23d with a reference voltage Vref as a threshold. The distance calculator 23g calculates a distance of the obstacle based on clock information outputted from the time counter 23f. The clock information represents the number of clock signals CLK counted by the time counter 23f.

The phase-information synchronous detector 24 performs a synchronous detection of the received signal of the receiving device 13p. The phase-information synchronous detector 24 includes a band-pass filter (BPF) 27p, a first phase sensitive detector (PSD) 24a, a second phase sensitive detector (PSD) 24b, a first low-pass filter (LPF) 24c, a second low-pass filter (LPF) 24d, and an angle calculator 24e. The first low-pass filter 24c processes an output signal of the first phase sensitive detector 24a. The second low-pass filter 24d processes an output signal of the second phase sensitive detector 24b. The first phase sensitive detector 24a receives a frequency-locked signal from the phase-locked loop 22 and uses the frequency-locked signal as a reference signal to perform the synchronous detection. The second phase sensitive detector 24b performs the synchronous detection using a reference signal that is phase-shifted by $\pi/2$ from the frequency-locked signal.

The phase-information synchronous detector 25 performs a synchronous detection of the received signal of the receiving device 13s. The phase-information synchronous detector 25 includes a band-pass filter (BPF) 27s, a first phase sensitive detector (PSD) 25a, a second phase sensitive detector (PSD) 25b, a first low-pass filter (LPF) 25c, a second low-pass filter (LPF) 25d, and an angle calculator 25e. The first low-pass filter 25c processes an output signal of the first phase sensitive detector 25a. The second low-pass filter 25d processes an output signal of the second phase sensitive detector 25b. The first phase sensitive detector 25a receives the frequency-locked signal from the phase-locked loop 22 and uses the frequency-locked signal as a reference signal to perform the synchronous detection. The second phase sensitive detector 25b performs the synchronous detection using a reference signal that is phase-shifted by $\pi/2$ from the frequency-locked signal.

The ultrasonic transmitter 26a outputs a transmission signal St to the transmitting device 13r. Upon receipt of the transmission signal St from the ultrasonic transmitter 26a, the transmitting device 13r transmits an ultrasonic wave. At the same time, the ultrasonic transmitter 26a outputs the transmission signal St to the time counter 23f.

The ultrasonic sensor 10 detects the obstacle as follows. The detection of the position of the obstacle requires both distance information Dd and phase difference information Dp. The distance information Dd corresponds to a distance between the ultrasonic sensor 10 and the obstacle, and the phase difference information Dp corresponds to a direction (i.e., angle) of the obstacle with respect to the ultrasonic sensor 10. The phase difference information Dp consists of horizontal phase difference information Dph and vertical phase difference information Dpv.

Firstly, the circuit device 18 receives from the ECU the control signal that controls pressure and phase of an ultrasonic wave to be transmitted. In the circuit device 18, the ultrasonic transmitter 26a outputs the transmission signal St to the piezoelectric element 11r of the transmitting device 13r according to the control signal. The piezoelectric element 11r vibrates according to the transmission signal St and thus emits the ultrasonic wave having the controlled pressure and phase. The emitted ultrasonic wave propagates through the acoustic matching member 12r and is transmitted to outside of the vehicle through the transmitting surface 12a of the acoustic matching member 12r.

The ultrasonic wave transmitted through the transmitting surface 12a of the acoustic matching member 12r is reflected from the obstacle. The reflected ultrasonic wave is received through the receiving surfaces 12a of the acoustic matching members 12q, 12p, and 12s, respectively. The received ultrasonic waves propagate to the piezoelectric elements 11q, 11p, and 11s through the acoustic matching members 12q, 12p, and 12s, respectively. Then, the ultrasonic waves are converted to the received signals (i.e., voltage signals) by the piezoelectric elements 11q, 11p, and 11s, respectively.

The received signals of the receiving devices 13q, 13p, and 13s have different phases. Here, it is assumed that the received signal of the reference receiving device 13q is given by $\sin(\omega t+\alpha)$, that the received signal of the receiving device 13p is given by $\sin(\omega t+\beta)$, and that the received signal of the receiving device 13r is given by $\sin(\omega t+\gamma)$. As noted previously, the receiving device 13p is located adjacent to the reference receiving device 13q in the horizontal direction, the receiving device 13r is located adjacent to the reference receiving device 13q in the vertical direction.

The received signal of the reference receiving device 13q is amplified by the amplifier 21p and then inputted to the phase-locked loop 22. In the phase-locked loop 22, the band-pass filter 22a removes unwanted frequency components from the received signal of the reference receiving device 13q. An output signal of the band-pass filter 22a is low-pass filtered by the low-pass filter 22c and then inputted to the voltage-controlled oscillator 22d. The phase detector 22b detects a phase difference between the received signal of the reference receiving device 13q and an output signal of the voltage-controlled oscillator 22d. The phase difference is feedback to the voltage-controlled oscillator 22d. Thus, the output signal of the voltage-controlled oscillator 22d is synchronized with (i.e., locked to the frequency of) the received signal of the reference receiving device 13q.

Below, a method of obtaining the distance information Dd is described. In the distance-information synchronous detector 23, the received signal of the reference receiving device 13q is inputted to the phase sensitive detector 23a. The phase sensitive detector 23a is switched between an amplify (x1) and an inverter (x−1) synchronously with the frequency-locked signal received from the phase-locked loop 22. In this way, the phase sensitive detector 23a performs the synchronous detection by using the frequency-locked signal as a reference signal. As a result of the synchronous detection, a frequency component of the received signal equal to a frequency of the reference signal is converted to a DC component and passes through the low-pass filter 23b. The other components of the received signal are converted to AC components and thus removed by the low-pass filter 23b.

In the distance calculation circuit 23c, an output signal of the low-pass filter 23b is amplified by the amplifier 23d and then inputted to the comparator 23e. The comparator 23e compares the inputted signal with the reference voltage Vref. If a voltage level of the inputted signal exceeds the reference voltage Vref, the comparator 23e outputs a receipt signal to the time counter 23f. The time counter 23f counts clock signals CLK from when the transmission signal St is received to when the receipt signal is received. Thus, the time counter 23f can accurately measure a time elapsed from when the ultrasonic wave is transmitted by the transmitting device 13r to when the ultrasonic wave is received by the reference receiving device 13q. The time counter 23f outputs to the distance calculator 23g the clock information representing the number of clock signals CLK counted by the time counter 23f. The distance calculator 23g calculates the distance between the ultrasonic sensor 10 and the obstacle based on the clock information and outputs the distance information Dd corresponding to the calculated distance.

Below, a method of obtaining the horizontal phase difference information Dph is described below. The received signal of the receiving device 13p, which is located adjacent to the reference receiving device 13q in the horizontal direction, is amplified by the amplifier 23d and then inputted to the phase-information synchronous detector 24 via the band-pass filter 27p. If a signal to noise (S/N) ratio of the received signal of the receiving device 13p is good, the band-pass filter 27p can be eliminated.

In the phase-information synchronous detector 24, the received signal of the reference receiving device 13p is inputted to the first phase sensitive detector 24a. The first phase sensitive detector 24a is switched between an amplify (x1) and an inverter (x−1) synchronously with the frequency-locked signal received from the phased-lock loop 22. In this way, the first phase sensitive detector 24a performs the synchronous detection by using the frequency-locked signal as a reference signal.

Further, in the phase-information synchronous detector 24, the received signal of the reference receiving device 13p is inputted to the second phase sensitive detector 24b. The second phase sensitive detector 24b is switched between an amplify (x1) and an inverter (x−1) synchronously with a π/2-phase-shifted signal that is phase-shifted by π/2 from the frequency-locked signal. In this way, the second phase sensitive detector 24b performs the synchronous detection by using the π/2-phase-shifted signal as a reference signal.

The synchronous detection performed by the first phase sensitive detector 24a is described in detail below. In the first phase sensitive detector 24a, the received signal is given by $\sin(\omega t+\beta)$, and the reference signal is given by $\sin(\omega t+\alpha)$. The following equation is obtained by multiplying the received signal of $\sin(\omega t+\beta)$ by the reference signal of $\sin(\omega t+\alpha)$.

$$\sin(\omega t+\beta)\sin(\omega t+\alpha)=-1/2\cos(2\omega t+\alpha+\beta)+1/2\cos(\beta-\alpha) \quad (1)$$

In the above equation (1), a frequency component of the received signal equal to a frequency of the reference signal is converted to a DC component and passes through the low-pass filter 24c. The other components of the received signal are converted to AC components and removed by the low-pass filter 24c. That is, the first low-pass filter 24c removes the first term "$-1/2\cos(2\omega t+\alpha+\beta)$" of the equation (1) and passes the second term "$1/2\cos(\beta-\alpha)$".

Next, the synchronous detection performed by the second phase sensitive detector 24b is described in detail below. The second phase sensitive detector 24b performs the synchronous detection using the π/2-phase-shifted signal as a reference signal.

In the second phase sensitive detector 24b, the received signal is given by $\sin(\omega t+\beta)$, and the reference signal is given by $\cos(\omega t+\alpha)$. The following equation is obtained by multiplying the received signal of $\sin(\omega t+\beta)$ by the reference signal of $\cos(\omega t+\alpha)$.

$$\sin(\omega t+\beta)\cos(\omega t+\alpha)=1/2\sin(2\omega t+\alpha+\beta)+1/2\sin(\beta-\alpha) \quad (2)$$

Therefore, the low-pass filter 24d removes the first term "$1/2\sin(2\omega t+\alpha+\beta)$" of the equation (2) and passes the second term "$1/2\sin(\beta-\alpha)$".

Each of the output signals of the low-pass filters 24c, 24d depend on a phase difference "β−α" between the received signal of the reference receiving device 13q and the received signal of the receiving device 13p. The output signals of the low-pass filters 24c, 24d are inputted to the angle calculator 24e. The angle calculator 24e calculates $\tan(\beta-\alpha)$ by using the output signals of the low-pass filters 24c, 24d. In such an approach, the phase difference "β−α" between the received signals of the reference receiving device 13q and the receiving device 13p can be calculated without influence of amplitudes of the received signals on the phase difference "β−α". The $\tan(\beta-\alpha)$ is outputted as the horizontal phase difference information Dph.

Below, a method of obtaining the vertical phase difference information is described below. The received signal of the receiving device 13s, which is located adjacent to the reference receiving device 13q in the vertical direction, is processed by the phase-information synchronous detector 25 in the same way as the received signal of the receiving device 13p is processed by the phase-information synchronous detector 24. Thus, a phase difference "γ−α" between the received signals of the reference receiving device 13q and the receiving device 13s is calculated so that the angle calculator 25e can output tan(γ−α) as the vertical phase difference information Dpv.

As described above, the received signal of the reference receiving device 13q is used as a reference signal to perform the synchronous detections of the received signals of the receiving devices 13p, 13s. The distance information Dd, the horizontal phase difference information Dph, and the vertical phase difference information Dpv are obtained by the distance-information synchronous detector 23 and the phase-information synchronous detectors 24, 25. The position of the obstacle is measured based on the obtained information Dd, Dph, and Dpv and distances between the receiving devices 13q, 13p, and 13s. Since each of the receiving devices 13p, 13s is located in a direction perpendicular to the reference receiving device 13q, the ultrasonic sensor 10 can accurately detect the horizontal and vertical phase differences corresponding to the position of the obstacle over a wide range of area.

The use of the reference receiving device 13q reduces influence of Doppler effect on the phase differences. Therefore, the phase differences can be easily, accurately detected.

Since one of the receiving devices is used as a reference to perform the synchronous detection, a special (specific) reference device for the synchronous detection is not required. Therefore, the circuit device 18 can be simplified in structure and reduced in size.

As described above, according to the first embodiment, the ultrasonic sensor 10 can have the following advantages.

(1) The phase-looked loop 22 generates a reference signal that is locked to the frequency of the received signal of the reference receiving device 13q. The received signals of the receiving devices 13p, 13s are synchronously detected by using the reference signal. The distance information Dd, the horizontal phase difference information Dph, and the vertical phase difference information Dpv are obtained by the distance-information synchronous detector 23 and the phase-information synchronous detectors 24, 25. The position of the obstacle is measured based on the obtained information Dd, Dph, and Dpv and distances between the receiving devices 13q, 13p, and 13s. Since each of the receiving devices 13p, 13s is located in the direction perpendicular to the reference receiving device 13q, the ultrasonic sensor 10 can accurately detect the horizontal and vertical phase differences corresponding to the position of the obstacle over a wide range of area.

Since the influence of Doppler effect on the phase differences is reduced by using the reference receiving device 13q, the phase differences can be easily, accurately detected.

Since one of the receiving devices is used as a reference to perform the synchronous detection, the circuit device 18 can be simplified in structure and reduced in size.

(2) The reference signal for the synchronous detection is generated by the phase-locked loop 22. In such an approach, even when the received signal of the reference receiving device 13q is weak, the reference signal can be generated accurately.

(3) The time elapsed from when the ultrasonic wave is transmitted by the transmitting device 13r to when the ultrasonic wave is received by the reference receiving device 13q is measured based on the transmission signal St outputted from the ultrasonic transmitter 26a. The distance to the obstacle is calculated based on the elapsed time. In such an approach, the distance can be accurately measured.

Modification of First Embodiment

The first embodiment described above can be modified, for example, as follows.

In the first embodiment, the reference signal for the synchronous detection is generated by using the phase-locked loop 22. Alternatively, the reference signal can be generated by using another device such as a comparator constructed with an operational amplifier.

In the first embodiment, the distance to the obstacle is calculated by the distance calculation circuit 23c based on the transmission signal St outputted from the ultrasonic transmitter 26a. Alternatively, the distance can be calculated based on the received signals of the receiving devices 13p, 13s without using the transmission signal St.

In the first embodiment, the transmitting device 13r is arranged together with the receiving devices 13q, 13p, and 13s in an array. Alternatively, the transmitting device 13r can be arranged separately from the receiving devices 13q, 13p, and 13s. For example, the transmitting device 13r can be formed as a separate piece from the receiving devices 13q, 13p, and 13s and placed outside the housing 31.

In the first embodiment, the transmitting device 13r is located diagonally to the reference receiving device 13q, and the receiving devices 13p, 13s are located in the direction perpendicular to the reference receiving device 13q. This arrangement can vary depending on an intended use of the ultrasonic sensor 10. For example, the reference receiving device 13q and the receiving device 13s can interchange such that the reference receiving device 13q is located adjacent to the transmitting device 13r in the horizontal direction.

The ultrasonic sensor 10 can include multiple transmitting devices. For example, in addition to the transmitting device 13r, the receiving device 13p can be used as a transmitting device. In this case, pressure of an ultrasonic wave transmitted by the ultrasonic sensor 10 can be increased by simultaneously driving the transmitting devices 13r, 13p. Further, ultrasonic transmission interval can be reduced by alternating driving the transmitting devices 13r, 13p. Furthermore, even when one of the transmitting devices 13r, 13p is broken, the ultrasonic wave can be transmitted by using the other of the transmitting devices 13r, 13p. Thus, the ultrasonic sensor 10 can be configured in a redundant manner.

Figure 3A:
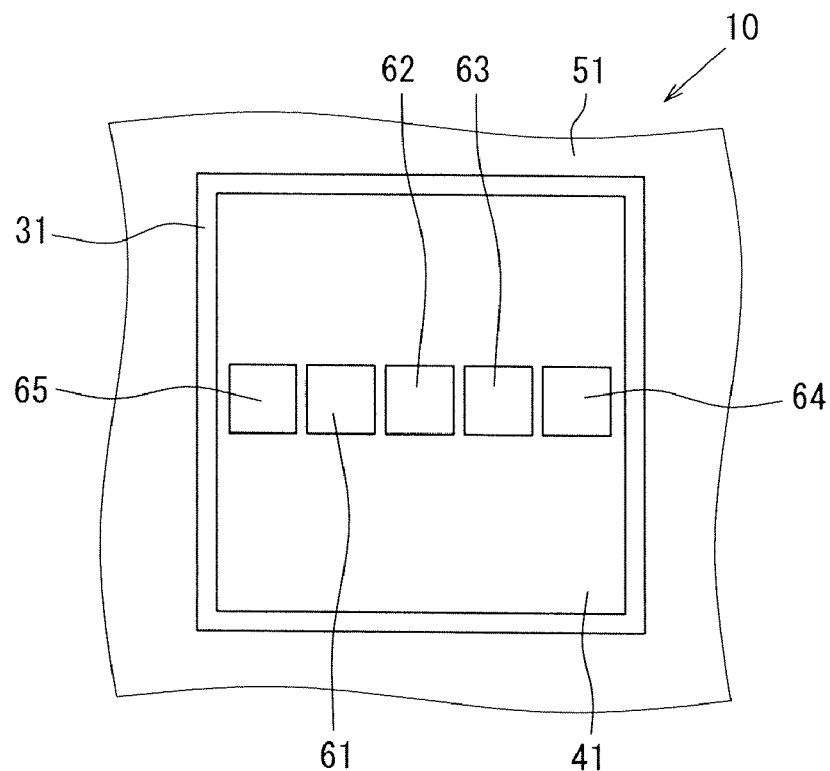
FIG. 3A is a diagram illustrating a top view of an ultrasonic sensor according to a modification of the first embodiment.
Figure 3B:
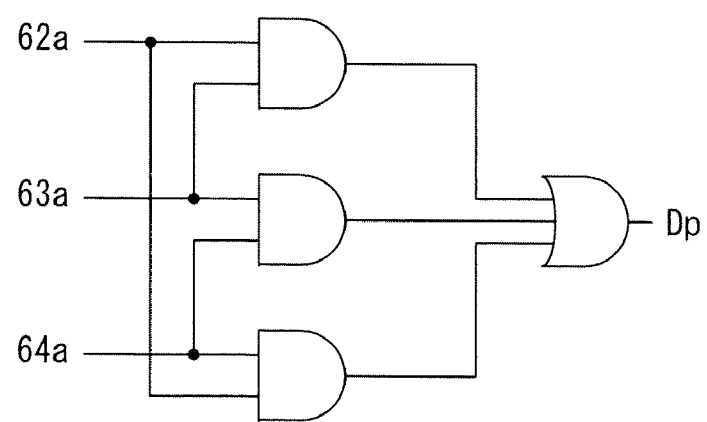
FIG. 3B is a diagram illustrating a majority circuit of a circuit device of the ultrasonic sensor of FIG. 3A.

The number and arrangement of the receiving devices can vary depending on the intended use. In an example shown in FIG. 3A, a reference receiving device 61, receiving devices 62-64, and a transmitting device 65 line up in the horizontal direction. In such an approach, the horizontal phase difference information Dph can be accurately obtained. In this case, as shown in FIG. 3B, phase difference information 62a-64a respectively obtained from the receiving devices 62-64 can be inputted to a majority circuit. In such an approach, even when there is a variation in the phase difference information 62a-64a, the variation can be reduced. Further, if the variation is caused due to a malfunction of any of the receiving devices 62-64, the malfunctioning receiving device can be identified.

Figure 4:
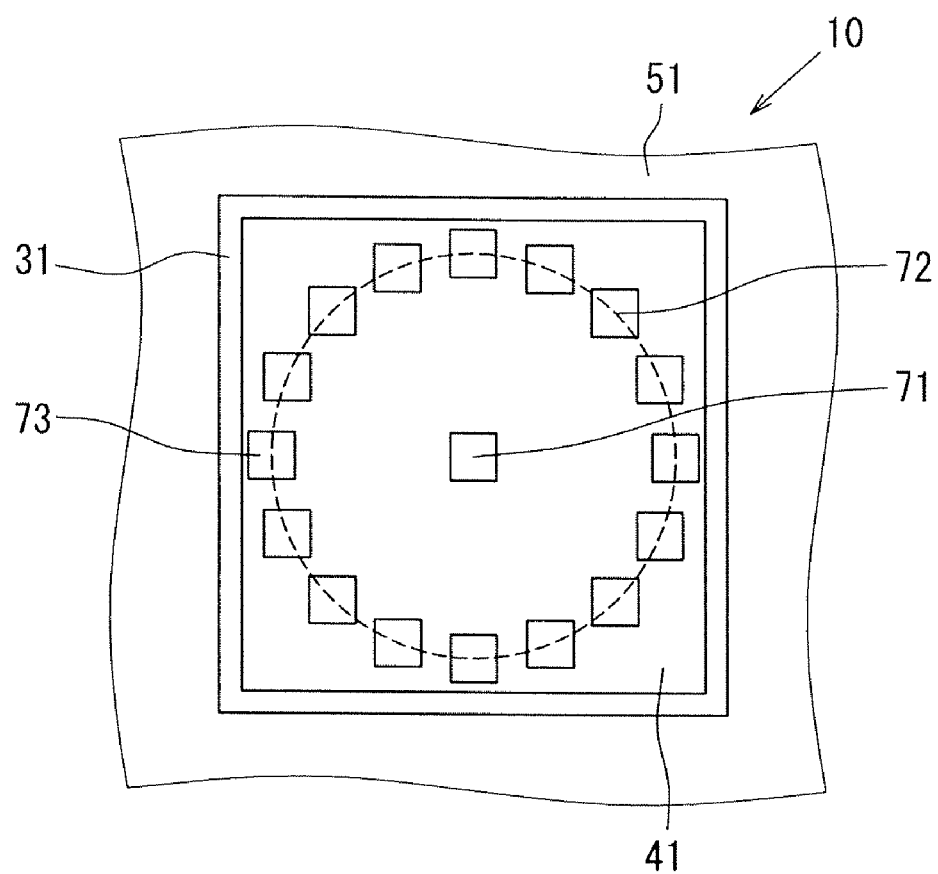
FIG. 4 is a diagram illustrating a top view of an ultrasonic sensor according to another modification of the first embodiment.

In another example shown in FIG. 4, multiple receiving devices 72 and a transmitting device 73 are arranged circularly around a reference receiving device 71. In this case, one receiving device 72 located in a direction to the obstacle detects a phase difference smaller than those detected by any other receiving devices 72. Therefore, the direction of the obstacle can be accurately detected.

The distance-information synchronous detector 23 can obtain the distance information Dd based on the receive signal of a receiving device other than the reference receiving device 13q. For example, the output signal of the low-pass filter 24c of the phase-information synchronous detector 24 can be inputted to the distance calculation circuit 23c so that the distance-information synchronous detector 23 can obtain the distance information Dd based on the receive signal of the receiving device 13p.

Figure 5A:
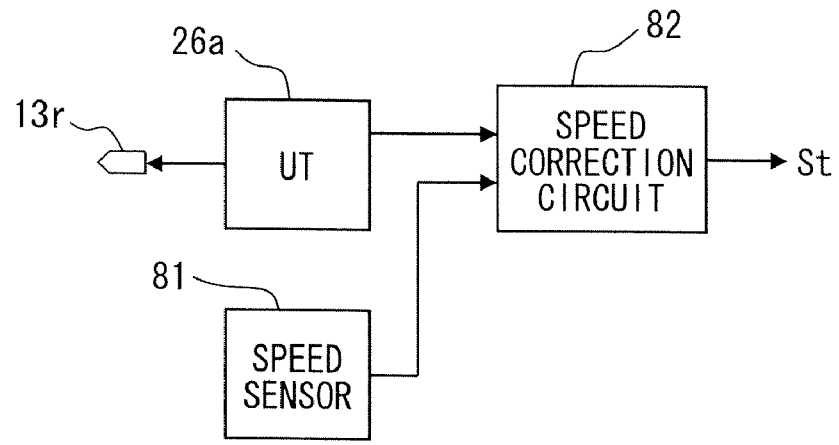
FIG. 5A is a partial block diagram of a circuit device of an ultrasonic sensor according to another modification of the first embodiment.
Figure 5B:
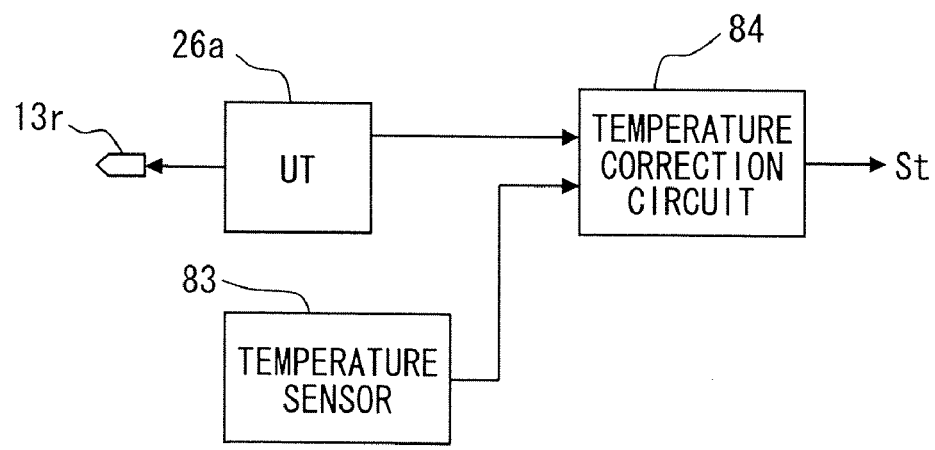
FIG. 5B is a partial block diagram of a circuit device of an ultrasonic sensor according to another modification of the first embodiment.

The reference signal for the synchronous detection can be corrected based on sensor signals outputted from sensors mounted on the vehicle. For example, as shown in FIG. 5A, the circuit device 18 can include a speed correction circuit 82. The speed correction circuit 82 adjusts the frequency of the transmission signal St based on a vehicle speed detected by a vehicle speed sensor 81, which is mounted on the vehicle. In such an approach, influence of Doppler effect due to the vehicle speed on the reference signal can be eliminated so that the reference signal can be generated accurately. In another example shown in FIG. 5B, the circuit device 18 includes a temperature correction circuit 84. The temperature correction circuit 84 adjusts the frequency of the transmission signal St based on a temperature outside the vehicle detected by a temperature sensor 83, which is mounted on the vehicle. In such an approach, influence of a sound speed change, due to a temperature change, on the reference signal can be eliminated so that the reference signal can be generated accurately.

Second Embodiment

An ultrasonic sensor 20 according to a second embodiment of the present invention is described below with reference to FIGS. 6A, 6B, and 7. Differences between the first and second embodiments are as follows.

Figure 6A:
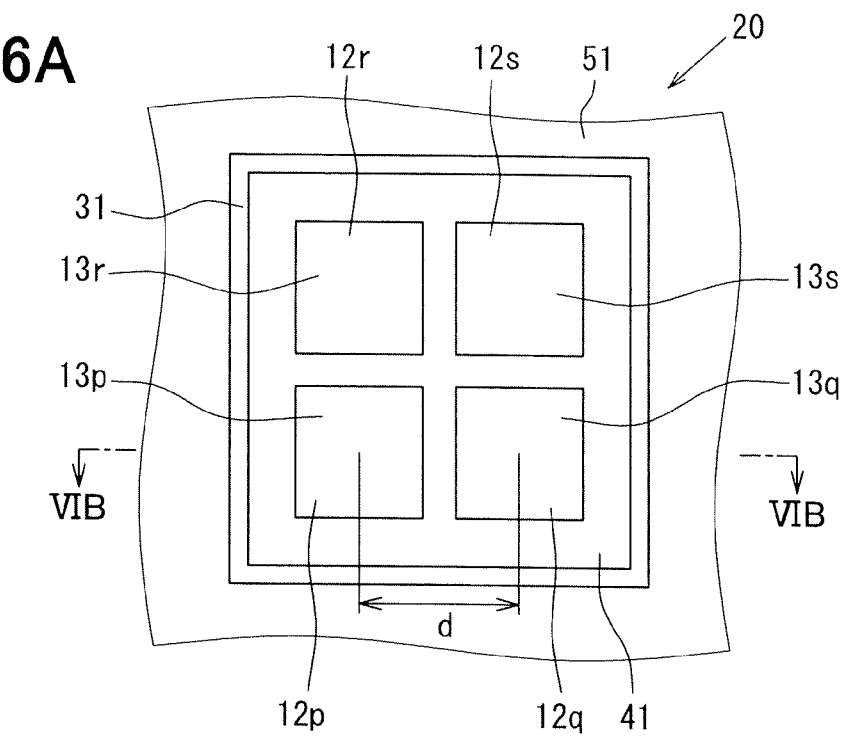
FIG. 6A is a diagram illustrating a top view of an ultrasonic sensor according to a second embodiment of the present invention.
Figure 6B:
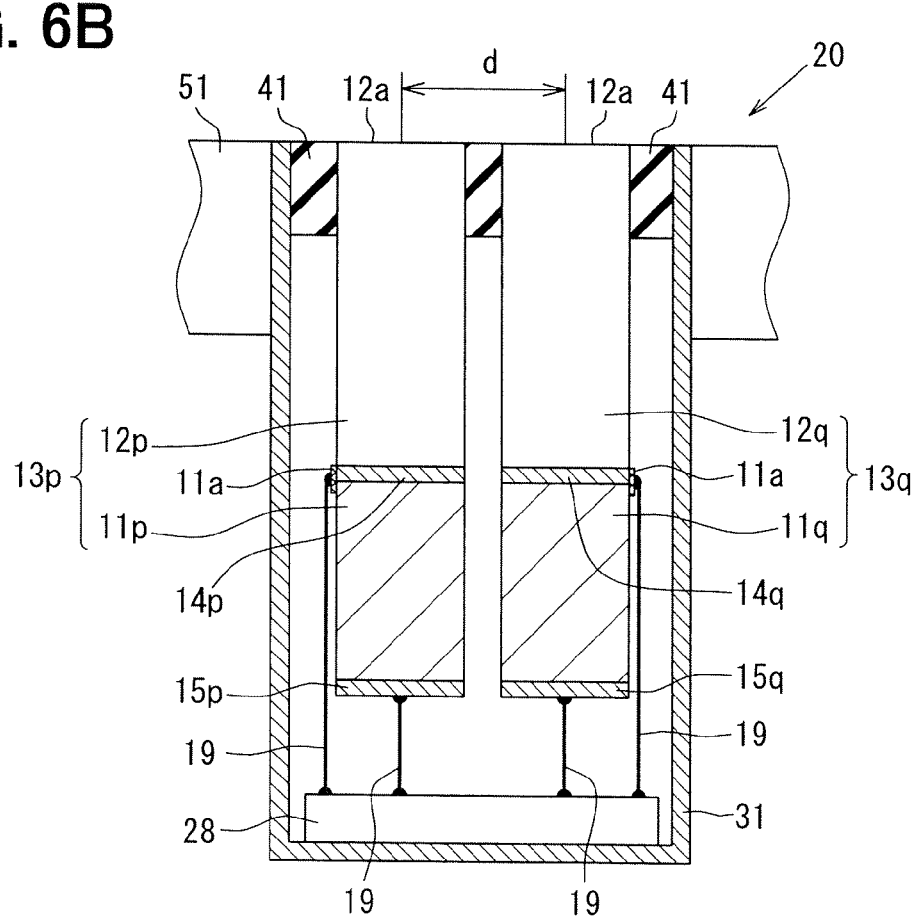
FIG. 6B is a diagram illustrating a cross-sectional view taken along line VIB-VIB of FIG. 6A.
Figure 7:
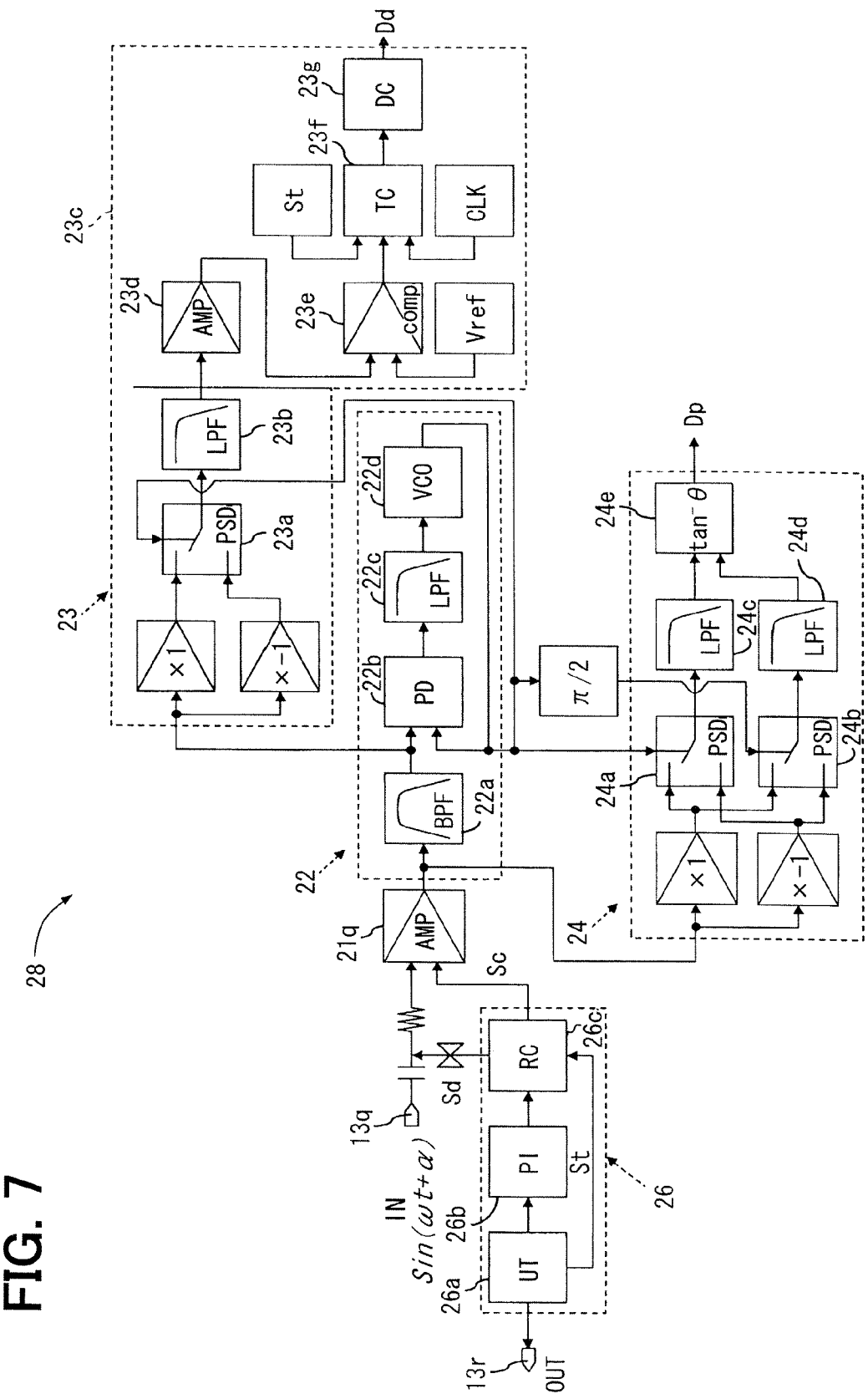
FIG. 7 is a block diagram of a circuit device of the ultrasonic sensor of the second embodiment.

As shown in FIGS. 6A, 6B, the ultrasonic sensor 20 includes four sensor devices 13p-13s arranged in an array of two rows and two columns, a circuit device 28 electrically coupled to the sensor devices 13p-13s, and the housing 31 for accommodating the sensor devices 13p-13s and the circuit device 28.

The sensor device 13r serves as a transmitting device for transmitting an ultrasonic wave. Each of the other sensor devices 13p, 13q, 13s serves as a receiving device for receiving the ultrasonic wave reflected from the obstacle. It is noted that although the sensor device 13q of the first embodiment serves as a reference receiving device, the sensor device 13q of the second embodiment serves as merely a receiving device.

The circuit device 28 is electrically coupled to the ECU (not shown) of the vehicle. When the ultrasonic sensor 20 transmits the ultrasonic wave, the circuit device 28 receives from the ECU the control signal that controls pressure and phase of the ultrasonic wave to be transmitted. The circuit device 28 outputs to the piezoelectric element 11r of the transmitting device 13r the voltage signal according to the control signal. When the ultrasonic sensor 20 receives the ultrasonic wave reflected from the obstacle, the circuit device 28 receives from, for example, the piezoelectric element 11q of the receiving device 13q the voltage signal corresponding to pressure and phase of the received ultrasonic wave. The circuit device 28 generates the vibration signal according to the voltage signal and outputs the vibration signal to the ECU.

The received signals of the receiving device 13p, 13q, 13s are processed by the circuit device 28 in the same way as each other. As an example, the received signal of the receiving device 13q is processed by the circuit device 28 as follows. A block diagram of the circuit device 28 corresponding to a section for processing the received signal of the receiving device 13q is illustrated in FIG. 7. Like the circuit device 18 of the first embodiment, the circuit device 28 includes the amplifier 21q, the phase-locked loop 22, the distance-information synchronous detector 23, and the phase-information synchronous detector 24.

It is noted that the circuit device 28 further includes a drive signal generator 26. The drive signal generator 26 includes the ultrasonic transmitter (UT) 26a, a phase inverter (PI) 26b, and a reception controller (RC) 26c. The ultrasonic transmitter 26a outputs the transmission signal St to the transmitting device 13r, and the transmitting device 13r transmits an ultrasonic wave upon receipt of the transmission signal St. At the same time, the ultrasonic transmitter 26a outputs the transmission signal St to the time counter 23f. The phase inverter 26b outputs to the reception controller 26c a signal having opposite phase to the transmission signal St. The reception controller 26c outputs a drive signal Sd to the receiving device 13q based on the output signal of the phase inverter 26b. In response to the drive signal Sd, the piezoelectric elements 11q is driven (i.e., vibrates) such that a vibration propagating from the transmitting device 13r to the receiving device 13q can be cancelled (i.e., removed). Further, the reception controller 26c outputs a cut signal Sc to the amplifier 21q during a period of time when the drive signal Sd is outputted. While receiving the cut signal Sc, the amplifier 21q interrupts the received signal of the receiving device 13q to a subsequent stage (i.e., the phase-locked loop 22 and the phase-information synchronous detector 24) of the circuit device 28.

The ultrasonic sensor 20 detects the obstacle as follows. The detection of the position of the obstacle requires both distance information Dd and phase-difference information Dp.

The circuit device 28 receives from the ECU the control signal that controls pressure and phase of an ultrasonic wave to be transmitted. In the circuit device 28, the ultrasonic transmitter 26a outputs the transmission signal St to the piezoelectric element 11r of the transmitting device 13r according to the control signal. The piezoelectric element 11r vibrates according to the transmission signal St and thus emits the ultrasonic wave having the controlled pressure and phase. The emitted ultrasonic wave propagates through the acoustic matching member 12r and is transmitted to outside of the vehicle through the transmitting surface 12a.

In the drive signal generator 26, the transmission signal St is phase-inverted by the phase inverter 26b. The phase-inverted signal having opposite phase to the transmission signal St is inputted to the reception controller 26c. Then, the reception controller 26c outputs the drive signal Sd to the receiving device 13q. In response to the drive signal Sd, the piezoelectric element 11q is driven such that the vibration propagating from the transmitting device 13r to the receiving device 13q can be cancelled. Specifically, the drive signal Sd causes the piezoelectric element 11q to vibrate at opposite phase to a vibration that propagates from the transmitting device 13r to the receiving device 13q through the vibration damper 41. The drive signal Sd is described in more detail later.

The ultrasonic wave transmitted through the transmitting surface 12a of the acoustic matching member 12r is reflected from the obstacle. The reflected ultrasonic wave is received through the receiving surfaces 12a of the acoustic matching member 12q. The received ultrasonic wave propagates to the piezoelectric element 11q through the acoustic matching members 12q. Then, the ultrasonic wave is converted to the received signal (voltage signal) by the piezoelectric elements 11q. Here, it is assumed that the received signal of the reference receiving device 13q is given by $\sin(\omega t + \alpha)$.

The received signal of the reference receiving device 13q is amplified by the amplifier 21q and then inputted to the phase-locked loop 22. In the phase-locked loop 22, the band-pass filter 22a removes unwanted frequency components from the received signal. An output signal of the band-pass filter 22a is low-pass filtered by the low-pass filter 22c and then inputted to the voltage-controlled oscillator 22d. The phase detector 22b detects a phase difference between the received signal and an output signal of the voltage-controlled oscillator 22d. The phase difference is feedback to the voltage-controlled oscillator 22d. Thus, the output signal of the voltage-controlled oscillator 22d is synchronized with (i.e., locked to the frequency of) the received signal.

Below, a method of obtaining the distance information Dd is described. In the distance-information synchronous detector 23, the received signal of the reference receiving device 13q is inputted to the phase sensitive detector 23a. The phase sensitive detector 23a is switched between an amplify (x1) and an inverter (x−1) synchronously with the frequency-locked signal received from the phase-locked loop 22. In this way, the phase sensitive detector 23a performs the synchronous detection by using the frequency-locked signal as a reference signal. As a result of the synchronous detection, a frequency component of the received signal equal to a frequency of the reference signal is converted to a DC component and passes through the low-pass filter 23b. The other components of the received signal are converted to AC components and removed by the low-pass filter 23b.

In the distance calculation circuit 23c, an output signal of the low-pass filter 23b is amplified by the amplifier 23d and then inputted to the comparator 23e. The comparator 23e compares the inputted signal with the reference voltage Vref. If the voltage level of the inputted signal exceeds the reference voltage Vref, the comparator 23e outputs the receipt signal to the time counter 23f. The time counter 23f counts clock signals CLK from when the transmission signal St is received to when the receipt signal is received. Thus, the time counter 23f can accurately measure the time elapsed from when the ultrasonic wave is transmitted by the transmitting device 13r to when the ultrasonic wave is received by the reference receiving device 13q. The time counter 23f outputs to the distance calculator 23g the clock information representing the number of clock signals CLK counted by the time counter 23f. The distance calculator 23g calculates the distance between the ultrasonic sensor 20 and the obstacle based on the clock information and outputs the distance information Dd corresponding to the calculated distance.

Below, a method of obtaining the phase difference information Dp is described below. The received signal of the receiving device 13q is amplified by the amplifier 21p and then inputted to the phase-information synchronous detector 24. In the phase-information synchronous detector 24, the received signal is inputted to the first phase sensitive detector 24a. The first phase sensitive detector 24a is switched between an amplify (x1) and an inverter (x−1) synchronously with the frequency-locked signal. In this way, the first phase sensitive detector 24a performs the synchronous detection by using the frequency-locked signal as a reference signal.

Further, in the phase-information synchronous detector 24, the received signal is inputted to the second phase sensitive detector 24b. The second phase sensitive detector 24b is switched between an amplify (x1) and an inverter (x−1) synchronously with a π/2-phase-shifted signal that is phase-shifted by π/2 from the frequency-locked signal. In this way, the second phase sensitive detector 24b performs the synchronous detection by using the π/2-phase-shifted signal as a reference signal.

The synchronous detection performed by the first phase sensitive detector 24a is described in detail below. Here, it is assumed that the frequency-locked signal outputted from the phase-locked loop 22 is given by sin(ωt+α). In the first phase sensitive detector 24a, the received signal is given by sin(ωt+β), and the reference signal is given by sin(ωt+α). The following equation is obtained by multiplying the received signal of sin(ωt+β) by the reference signal of sin(ωt+α).

$$\sin(\omega t+\beta)\sin(\omega t-\alpha)=-1/2 \cos(2\omega t+\alpha+\beta)+1/2 \cos(\beta-\alpha) \quad (3)$$

Thus, the first low-pass filter 24c removes the first term "−1/2 cos(2ωt+α+β)" of the equation (3) and passes the second term "1/2 cos(β−α)" of the equation (3).

Next, the synchronous detection performed by the second phase sensitive detector 24b is described in detail below. The second phase sensitive detector 24b performs the synchronous detection using the π/2-phase-shifted signal as a reference signal.

In the second phase sensitive detector 24b, the received signal is given by sin(ωt+β), and the reference signal is given by cos(ωt+α). The following equation is obtained by multiplying the received signal of sin(ωt+β) by the reference signal of cos(ωt+α).

$$\sin(\omega t+\beta)\cos(\omega t+\alpha)=1/2 \sin(2\omega t+\alpha+\beta)+1/2 \sin(\beta-\alpha) \quad (4)$$

Therefore, the low-pass filter 24d removes the first term "1/2 sin(2ωt+α+β)" of the equation (4) and passes the second term "1/2 sin(β−α)" of the equation (4).

Each of the output signals of the low-pass filters 24c, 24d depend on a phase "α". The output signals of the low-pass filters 24c, 24d are inputted to the angle calculator 24e. The angle calculator 24e calculates tan(β−α) by using the output signals of the low-pass filters 24c, 24d. In such an approach, the phase difference "β−α" can be calculated without influence of the amplitude of the received signal on the phase difference "β−α". The tan(β−α) is outputted as the phase difference information Dp.

In this way, the received signal of the receiving device 13q is processed by the circuit device 28 to obtain the distance information Dd and the phase difference information Dp. The received signals of the receiving devices 13p, 13s are processed by the circuit device 28 in the same way as the received signal of the receiving device 13q so that the distance information Dd and the phase information Dp can be obtained. Therefore, the position of the obstacle can be measured based on the obtained information Dd, Dp and distances between the receiving devices 13q, 13p, 13s. Since the receiving devices 13p, 13q, 13s are arranged in an array, the ultrasonic sensor 20 can accurately detect the phase differences corresponding to the position of the obstacle over a wide range of area.

Below, the drive signal Sd outputted from the drive signal generator 26 is described in detail with reference to FIGS. 8-10B.

Figure 8:
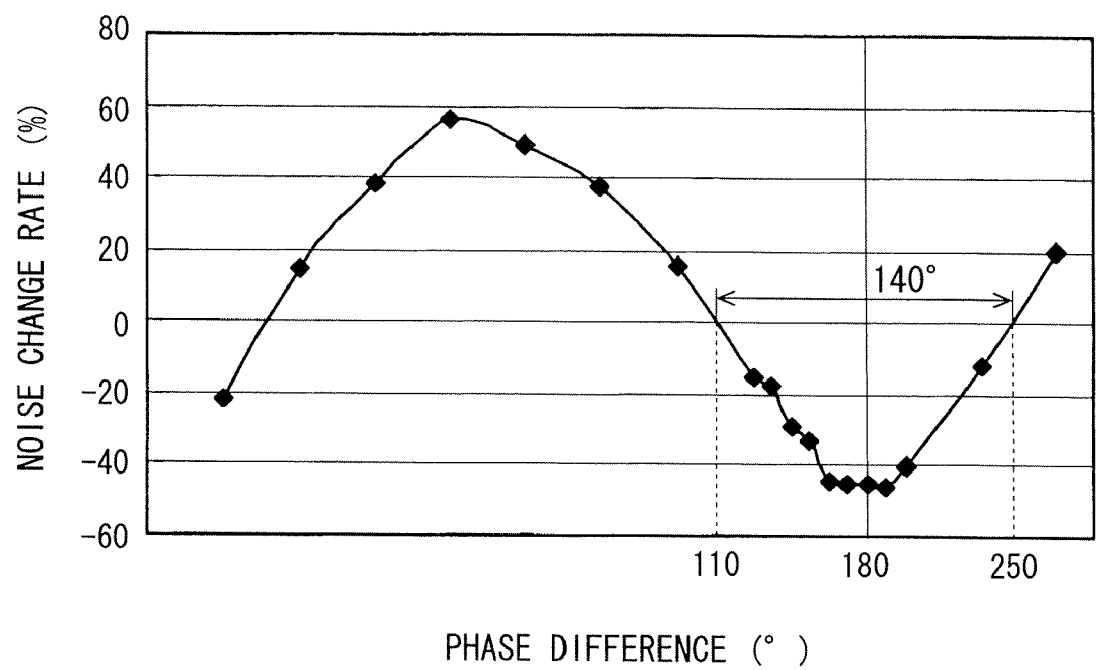
FIG. 8 is a diagram illustrating a relationship between a noise change rate and a phase difference between a drive signal applied to a receiving device and a vibration noise prorogating from a transmitting device to the receiving device of the ultrasonic sensor of the second embodiment.

FIG. 8 illustrates a relationship between a noise change rate and a phase difference between the drive signal Sd applied to the receiving device 13q and a vibration noise Sn prorogating from the transmitting device 13r to the receiving device 13p. As can be seen from FIG. 8, when the drive signal Sd has an opposite phase to the vibration noise Sn, the vibration noise Sn is at a minimum. Further, FIG. 8 indicates that when the phase difference between the drive signal Sd and the vibration noise Sn ranges from about 110 degrees to about 250 degrees, the vibration noise Sn is reduced by the drive signal Sd. Therefore, it is preferable that the drive signal Sd be controlled such that the phase difference between the drive signal Sd and the vibration noise Sn ranges from about 110 degrees to about 250 degrees.

Figure 9A:
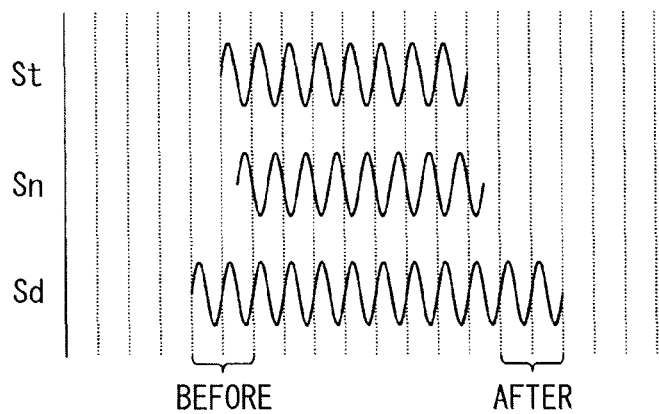
FIG. 9A is a diagram illustrating a transmission signal, a vibration noise, and a drive signal of the ultrasonic sensor of the second embodiment.

As shown in FIG. 9A, the vibration noise Sn has the same number of continuous waves as the transmission signal St. The drive signal Sd can be applied to the receiving device 13p even before the vibration noise Sn propagates to the receiving device 13p. Further, the application of the drive signal Sd to the receiving device 13p can continue for a predetermined time period even after the propagation of the vibration noise Sn to the receiving device 13p is ended.

Figure 9B:
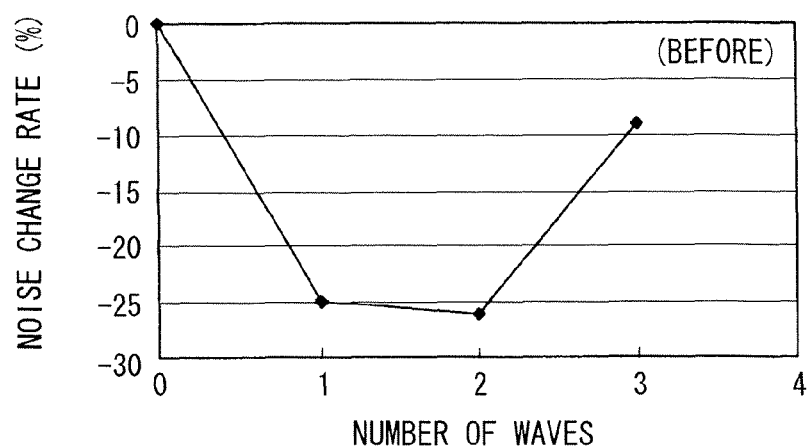
FIG. 9B is a diagram illustrating a relationship between the vibration noise change rate and the number of waves of the drive signal that is applied to the receiving device before start of a propagation of the vibration noise to the receiving device.

FIG. 9B illustrates a relationship between the vibration noise change rate and the number of waves of the drive signal Sd that is applied to the receiving device 13q before the vibration noise Sn propagates to the receiving device 13q. As can be seen from FIG. 9B, when at most two waves of the drive signal Sd are applied to the receiving device 13q before the start of the propagation of the vibration noise Sn to the receiving device 13q, the vibration noise Sn is effectively reduced by the drive signal Sd. Therefore, it is preferable that at most two waves of the drive signal Sd be applied to the receiving device 13q before the start of the propagation of the vibration noise Sn to the receiving device 13q.

Figure 9C:
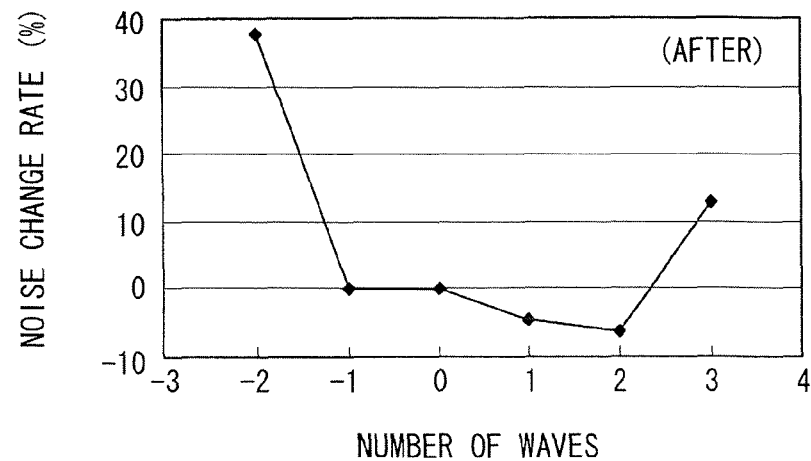
FIG. 9C is a diagram illustrating a relationship between the vibration noise change rate and the number of waves of the drive signal that is applied to the receiving device after end of the propagation of the vibration noise to the receiving device.

FIG. 9C illustrates a relationship between the vibration noise change rate and the number of waves of the drive signal Sd that is applied to the receiving device 13q after the propagation of the vibration noise Sn to the receiving device 13q is ended. As can be seen from FIG. 9C, when at most two waves of the drive signal Sd are applied to the receiving device 13q after the end of the propagation of the vibration noise Sn to the receiving device 13q, the vibration noise Sn is effectively reduced by the drive signal Sd. Therefore, it is preferable that at most two waves of the drive signal Sd be applied to the receiving device 13q after the end of the propagation of the vibration noise Sn to the receiving device 13q.

Further, FIG. 9C indicates that even when the application of the drive signal Sd to the receiving device 13q is ended at a time when the last wave of the vibration noise vibration Sn propagates to the receiving device 13q, the vibration noise vibration Sn is not increased. In other words, the last wave of the drive signal Sd can be applied to the receiving device 13q when the second last wave of the vibration noise Sn propagates to the receiving device 13q.

Figure 10A:
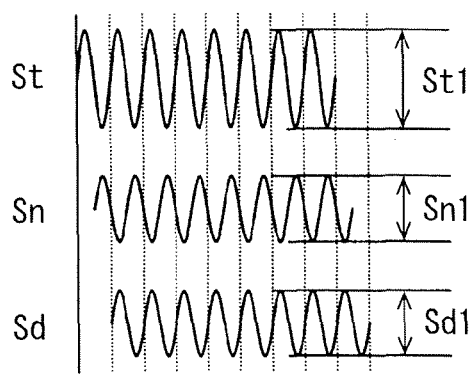
FIG. 10A is a diagram illustrating magnitudes of the transmission signal, the vibration noise, and the drive signal.

FIG. 10A illustrates magnitudes of the transmission signal St, the vibration noise Sn, and the drive signal Sd. As shown in FIG. 10A, a magnitude Sn1 of the vibration noise Sn is smaller than a magnitude St1 of the transmission signal St.

Figure 10B:
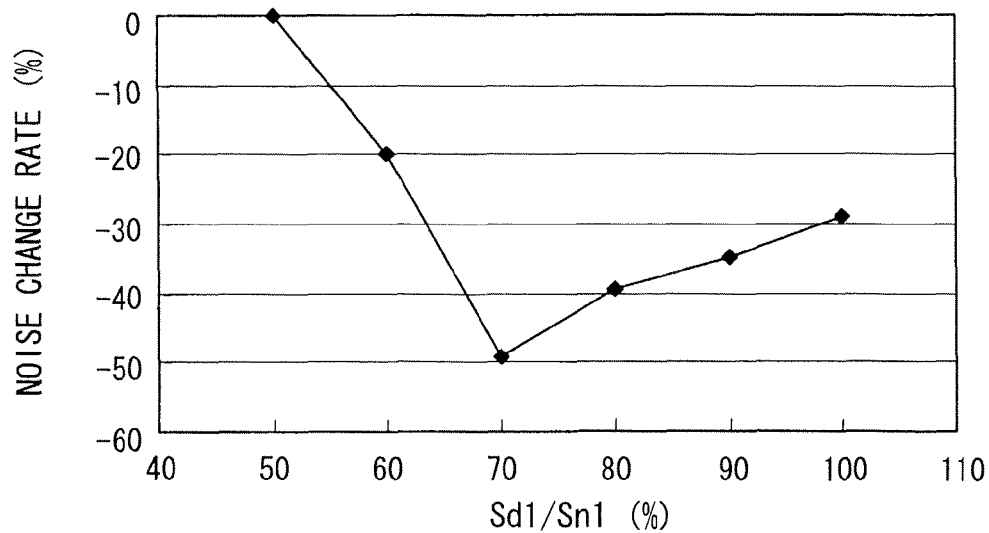
FIG. 10B is a diagram illustrating a relationship between the vibration noise change rate and a ratio of the magnitude of the drive signal to the magnitude of the vibration noise.

FIG. 10B illustrates a relationship between the vibration noise change rate and a ratio of a magnitude Sd1 of the drive signal Sd to the magnitude Sn1 of the vibration noise Sn. As can be seen from FIG. 10B, when the ratio of the magnitude Sd1 to the magnitude Sn1 ranges from 50 percent to 100 percent, the vibration noise Sn is reduced by the drive signal Sd. Therefore, it is preferable that the ratio of the magnitude Sd1 to the magnitude Sn1 range from 50 percent to 100 percent.

As described above, according to the second embodiment, the ultrasonic sensor 20 can have the following advantages.

(1) The ultrasonic sensor 20 includes the circuit device 28 having the drive signal generator 26. The drive signal generator 26 outputs the drive signal Sd to the piezoelectric elements 11q, 11p, 11s of the receiving devices 13q, 13p, 13s based on the transmission signal St outputted from the transmitting device 13r. The drive signal Sd causes the piezoelectric elements 11q, 11p, 11s to vibrate at opposite phase to the vibration that propagates from the transmitting device 13r to the receiving devices 13q, 13p, 13s through the vibration damper 41. Thus, the vibration propagating from the transmitting device 13r to the receiving devices 13q, 13p, 13s can be cancelled.

(2) It is preferable that the drive signal Sd be controlled such that the phase difference between the drive signal Sd and the vibration noise Sn range from about 110 degrees to about 250 degrees. In such an approach, the vibration noise Sn can be effectively reduced by the drive signal Sd.

It is preferable that at most two waves of the drive signal Sd be applied to the receiving devices 13p, 13q, 13r before the start of the propagation of the vibration noise Sn to the receiving devices 13p, 13q, 13r. In such an approach, the vibration noise Sn can be effectively reduced by the drive signal Sd.

It is preferable that at most two waves of the drive signal Sd be applied to the receiving devices 13p, 13q, 13r after the end of the propagation of the vibration noise Sn to the receiving device 13q. Further, it is acceptable that the last wave of the drive signal Sd be applied to the receiving device 13p, 13q, 13r when the second last wave of the vibration noise Sn propagates to the receiving device 13q.

It is preferable that the ratio of the magnitude Sd1 of the drive signal Sd to the magnitude Sn1 of the vibration noise Sn range from 50 percent to 100 percent. In such an approach, the vibration noise Sn can be effectively reduced by the drive signal Sd.

Modification of Second Embodiment

The second embodiment described above can be modified, for example, as follows.

(1) For example, when the receiving device 13q receives the ultrasonic wave reflected from the obstacle, the acoustic matching member 12q vibrates accordingly. The piezoelectric elements 11q may detect not only a first vibration of the acoustic matching member 12q corresponding to the received ultrasonic wave but also a second vibration of the acoustic matching member 12q caused by the reverberation of the first vibration. The second vibration detected by the piezoelectric elements 11q may result in an error. The drive signal generator 26 can be configured to prevent this problem. Specifically, the second vibration is inputted to the drive signal generator 26 through the amplifier 21q, and the drive signal generator 26 generates the drive signal Sd based on the second vibration.

Figure 11:
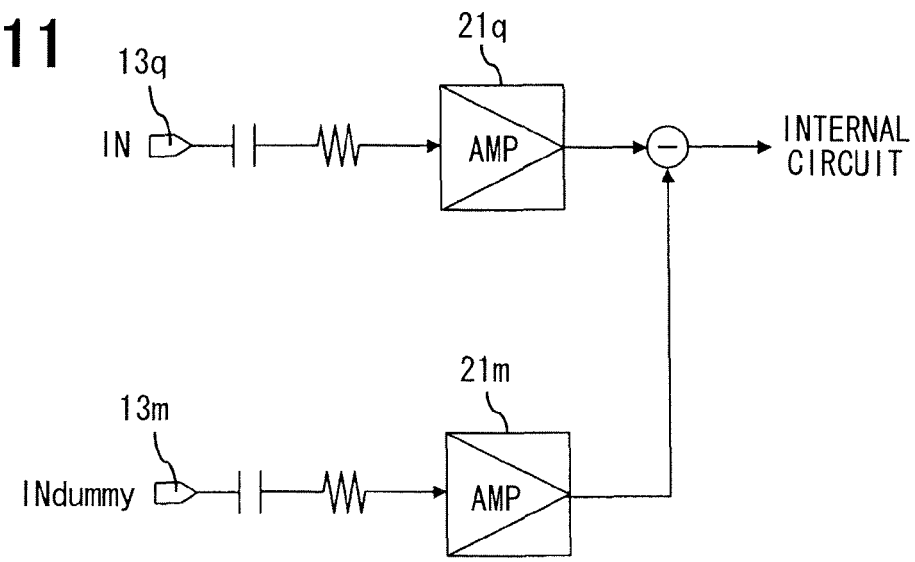
FIG. 11 is a partial block diagram of a circuit device of an ultrasonic sensor according to a modification of the second embodiment.

(2) As shown in FIG. 11, the ultrasonic sensor 20 can include a set of an amplifier 21m and a dummy device 13m instead of the drive signal generator 26. The dummy device 13m merely detects a vibration propagating from the transmitting device 13r. The vibration detected by the dummy device 13m is amplified by the amplifier 21m, and the amplifier 21m outputs a dummy vibration signal. In the circuit device 28, the dummy vibration signal is subtracted from the received signal of the receiving device 13q to cancel a vibration propagating from the transmitting device 13r to the receiving device 13q. Thus, like the drive signal generator 26, the amplifier 21m and the dummy device 13m work in conjunction with each other to cancel the vibration noise.

For example, the dummy device 13m can be formed by covering the receiving surface 12a of one receiving device with a covering material (e.g., rubber) that can interrupt the ultrasonic wave. Alternatively, the dummy device 13m can be formed by placing one receiving device inside the vibration damper 41 near the receiving device 13q. By the way, even when the receiving device 13q and the dummy device 13m have different sensitivities, the difference in sensitivities between the receiving device 13q and the dummy device 13m can be corrected by adjusting the amplifiers 21q, 21m.

Third Embodiment

An ultrasonic sensor 30 according to a third embodiment of the present invention is described below with reference to FIGS. 12A, 12B, and 13.

Figure 12A:
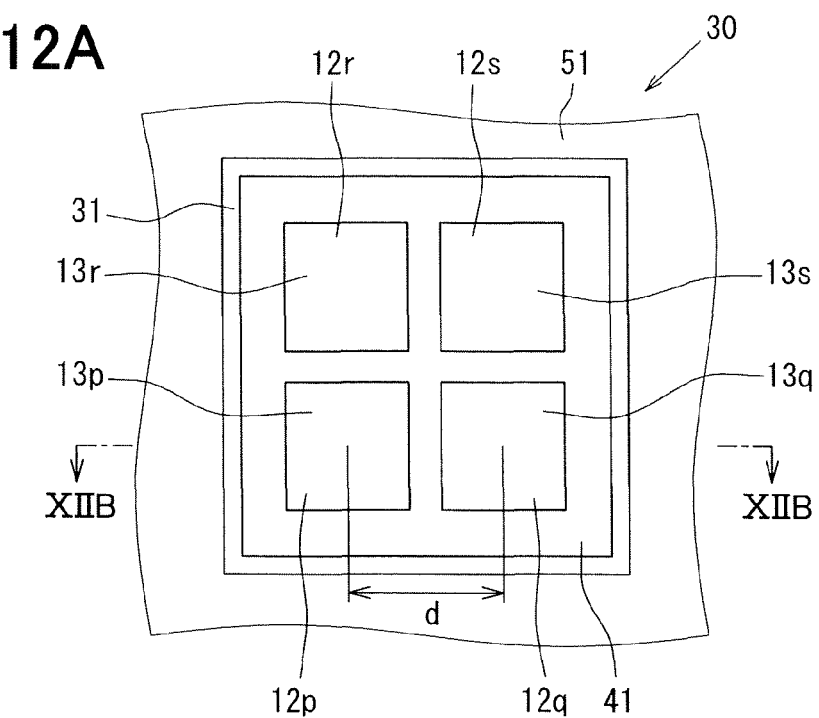
FIG. 12A is a diagram illustrating a top view of an ultrasonic sensor according to a third embodiment of the present invention.
Figure 12B:
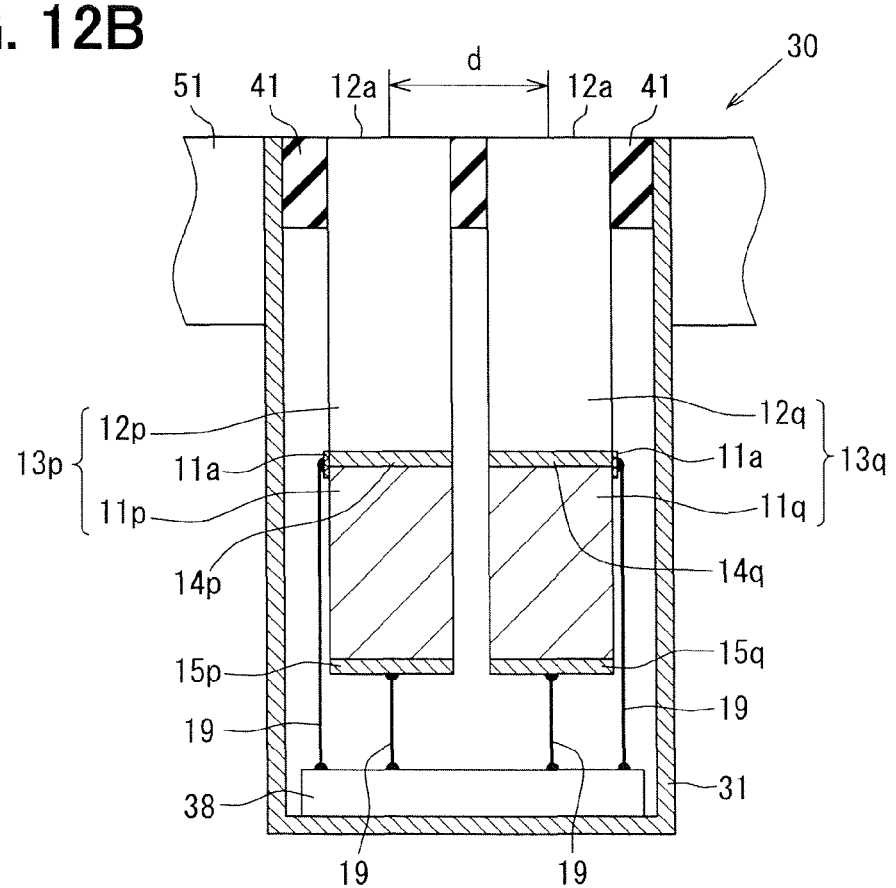
FIG. 12B is a diagram illustrating a cross-sectional view taken along line XIIB-XIIB of FIG. 12A.
Figure 13:
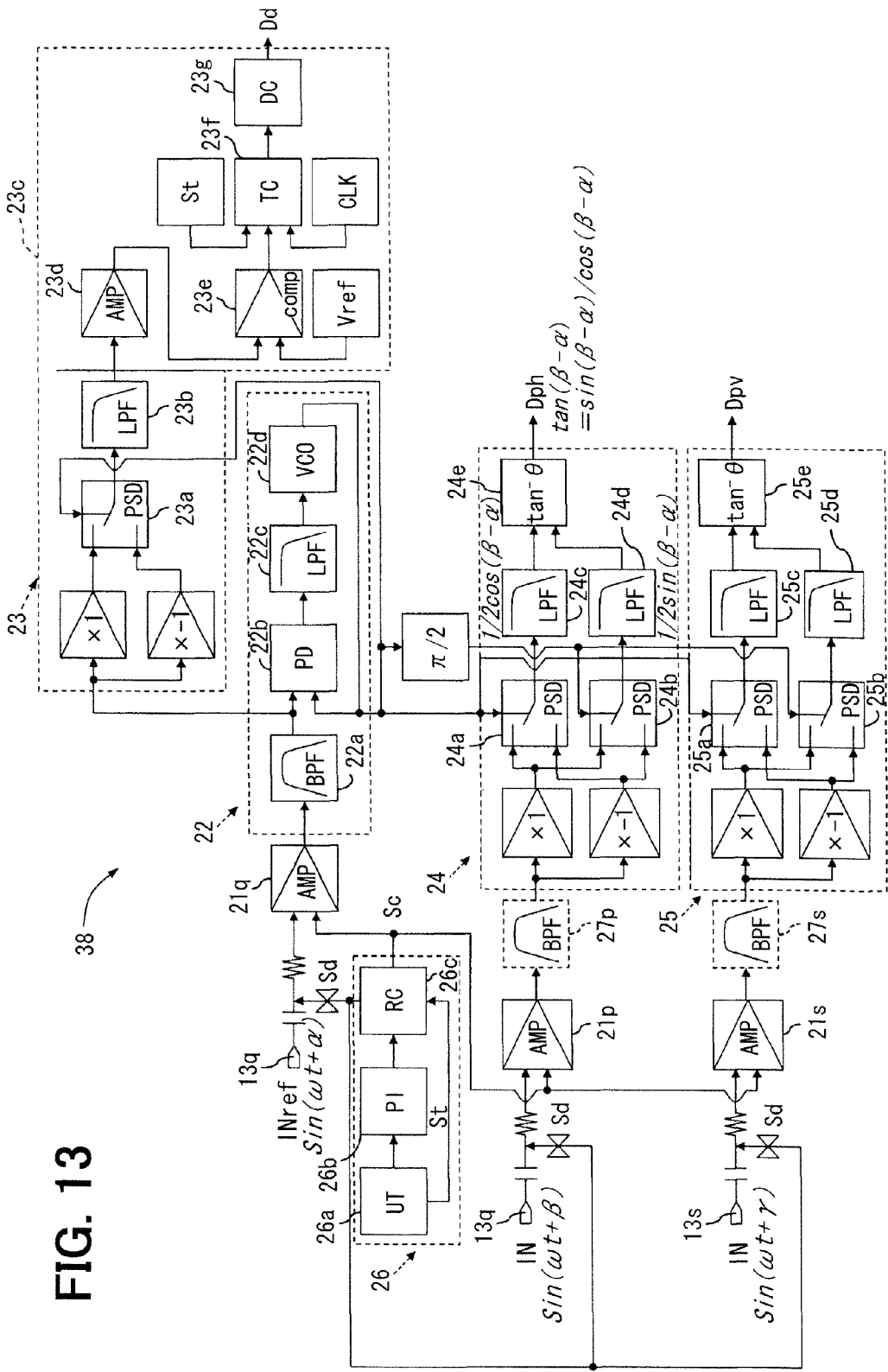
FIG. 13 is a block diagram of a circuit device of the ultrasonic sensor of the third embodiment.

As shown in FIGS. 12A and 12B, the ultrasonic sensor 30 includes four sensor devices 13p-13s arranged in an array of two rows and two columns, a circuit device 38 electrically coupled to the sensor devices 13p-13s, and the housing 31 for accommodating the sensor devices 13p-13s and the circuit device 38.

The sensor device 13r serves as a transmitting device for transmitting an ultrasonic wave. The sensor device 13q is located diagonally to the transmitting device 13r and serves a reference receiving device. The sensor device 13p is located adjacent to the reference receiving device 13q in a horizontal direction and serves as a receiving device (i.e., non-reference receiving device). The sensor device 13r is located adjacent to the reference receiving device 13q in a vertical direction and serves as a receiving device (i.e., non-reference receiving device). That is, like the first embodiment, the ultrasonic sensor 30 has a reference receiving element.

Further, like the second embodiment, the circuit device 38 of the ultrasonic sensor 30 has the drive signal generator 26 that outputs the drive signal Sd and the cut signal Sc.

In summary, the third embodiment corresponds to a combination of the first and second embodiments. Therefore, according to the third embodiment, the ultrasonic sensor 30 can have the advantages described in the first and second embodiments.

Fourth Embodiment

Figure 14A:
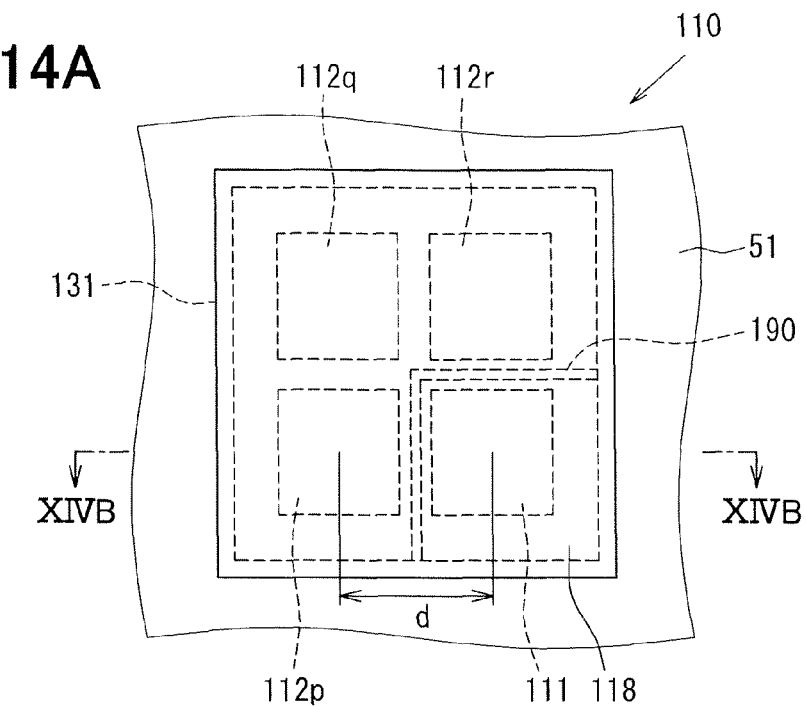
FIG. 14A is a diagram illustrating a top view of an ultrasonic sensor according to a fourth embodiment of the present invention.
Figure 14B:
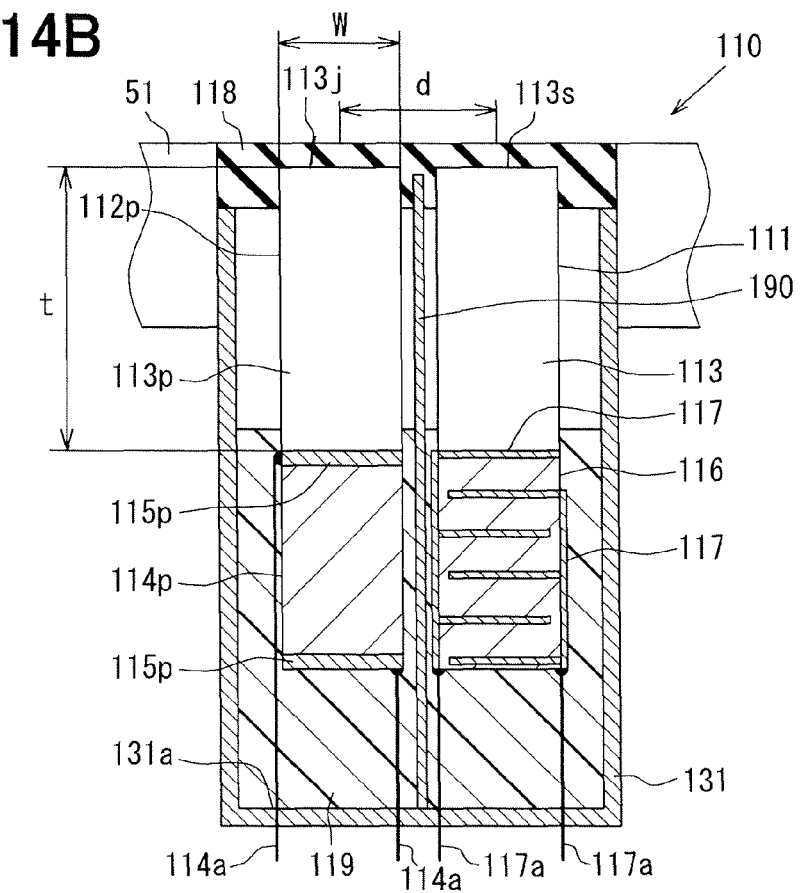
FIG. 14B is a diagram illustrating a cross-sectional view taken along line XIVB-XIVB of FIG. 14A.

An ultrasonic sensor 110 according to a fourth embodiment of the present invention is described below with reference to FIGS. 14A and 14B. Like the ultrasonic sensors 10-30 described in the preceding embodiments, for example, the ultrasonic sensor 110 can be used as an obstacle sensor mounted on a vehicle.

The ultrasonic sensor 110 includes a transmitting device 111, receiving devices 112p, 112q, 112r, a vibration damper 118, a first absorber 119, a vibration isolator 190, and a housing 131. The transmitting device 111 transmits an ultrasonic wave. The receiving devices 112p, 112q, 112r detect the ultrasonic wave reflected from the obstacle. The vibration damper 118 prevents propagation (i.e., vibration noise) of the ultrasonic wave among the transmitting device 111 and the receiving devices 112p, 112q, 112r. The first absorber 119 protects the transmitting device 111 and the receiving devices 112p, 112q, 112r from external force (impact) applied to the ultrasonic sensor 110. The vibration isolator 190 isolates the transmitting device 111 from the receiving devices 112p, 112q, 112r to prevent propagation of the ultrasonic wave from the transmitting device 111 to the receiving devices 112p, 112q, 112r. The housing 131 is shaped like a box having an opening. The transmitting device 111, the receiving devices 112p, 112q, 112r, the vibration damper 118, the first absorber 119, and the vibration isolator 190 are accommodated in the housing 131.

The receiving devices 112p, 112q, 112r are identical in structure. In an example below, the structure of the receiving device 112p is described. The receiving device 112p includes an acoustic matching member 113p and a piezoelectric element 114p joined to the acoustic matching member 113p. The acoustic matching member 113p receives the ultrasonic wave reflected from the obstacle and allows the ultrasonic wave to propagate to the piezoelectric element 114p. Thus, the piezoelectric element 114p detects the ultrasonic wave.

The piezoelectric element 114p can be made of, for example, piezoelectric zirconate titanate (PZT). The piezoelectric element 114p includes a piezoelectric body and a pair of electrodes 115p. The piezoelectric body has a rectangular cylindrical shape and is identical in cross-section to the acoustic matching member 113p. The electrodes 115p are respectively formed on opposite surfaces of the piezoelectric body in an ultrasonic propagation direction. That is, the piezoelectric body is sandwiched between the electrodes 115p. For example, the electrodes 115p can be formed by plating or sputtering of platinum (Pt), copper (Cu), or silver (Ag) or by baking of conductive paste.

The acoustic matching member 113p is made of a material having an acoustic impedance that is greater than an acoustic impedance of air and less than an acoustic impedance of the piezoelectric element 114p. For example, the acoustic matching member 113p can be made of a high durability resin material such as a polycarbonate resin.

A thickness t of the acoustic matching member 113p is substantially equal to one-quarter the wavelength of the ultrasonic wave in the acoustic matching member 113p. In such an approach, a standing wave is produced in the acoustic matching member 113p. Therefore, interference and cancellation between the ultrasonic wave entering the acoustic matching member 113p and the ultrasonic wave reflected at an interface between the piezoelectric element 114p and the acoustic matching member 113p can be reduced. As a result, the ultrasonic wave entering the acoustic matching member 113p can efficiently propagate to the piezoelectric element 114p. It is preferable that a width w of the acoustic matching member 113p be substantially equal to or less than one-half the wavelength of the ultrasonic wave in air.

The transmitting device 111 includes an acoustic matching member 113 and a multilayer piezoelectric element 116 joined to the acoustic matching member 113. The acoustic matching member 113 has the same structure as the acoustic matching member 113p.

The multilayer piezoelectric element 116 can be made of, for example, piezoelectric zirconate titanate (PZT). The multilayer piezoelectric element 116 includes a piezoelectric body and a pair of comb electrodes 117. The piezoelectric body has a rectangular cylindrical shape and is identical in cross-section to the acoustic matching member 113. The comb electrodes 117 are formed to the piezoelectric body such that piezoelectric layers are interleaved with electrode layers. The number of layers can vary according to pressure of the ultrasonic wave to be transmitted. As the number of layers increases, pressure of the ultrasonic wave transmitted by the multilayer piezoelectric element 116 increases.

The electrodes 115p of the piezoelectric element 114p are electrically coupled to a circuit device through wires 114a. The comb electrodes 117 of the multilayer piezoelectric element 116 are electrically coupled to the circuit device through wires 117a. The circuit device is electrically coupled to the ECU (not shown) of the vehicle. Although the circuit device is not shown in the drawings, the ultrasonic sensor 110 can include, for example, one of the circuit devices 18, 28, 38 described in the preceding embodiments.

The acoustic matching members 113, 113p-113r are arranged in an array through the vibration damper 118. It is preferable that a distance d between centers of adjacent acoustic matching members be substantially equal to one-half the wavelength of the ultrasonic wave.

The vibration damper 118 is fixed to the opening of the housing 131 to cover receiving surfaces 113j of the acoustic matching members 113p-113r and a transmitting surface 113s of the acoustic matching member 113. That is, the receiving surfaces 113j and the transmitting surface 113s are not exposed outside the housing 131. The vibration damper 118 prevents foreign matters such as water and dust from entering inside the housing 131. Therefore, reliability of the ultrasonic sensor 110 can be improved. The housing 131 is mounted to the vehicle such that the acoustic matching members 113, 113p-113r can face outside the vehicle. For example, the housing 131 is mounted to the bumper 51 of the vehicle.

The vibration damper 118 is made of a material that has a damping constant higher than a damping constant of each of the acoustic matching members 113, 113p-113r and that has an acoustic impedance less than an acoustic impedance of each of the acoustic matching members 113, 113p-113r. For example, the vibration damper 118 can be made of silicone rubber. Also, the vibration damper 118 can be made of a material having a low elastic modulus and a low density. For example, a foam material such as resin foam, foam rubber, or sponge rubber can be suitably used as a material for the vibration damper 118. Since the vibration damper 118 made of such a material is located among the acoustic matching members 113, 113p-113r, the propagation of the ultrasonic wave among the acoustic matching members 113, 113p-113r can be prevented. Accordingly, vibration noise originating from the propagation can be prevented.

In the fourth embodiment, the vibration damper 118 has the thickness of one millimeter (i.e., 1 mm) or less at a portion covering the receiving surfaces 113j and the transmitting surface 113s. In such an approach, the ultrasonic wave can be suitably transmitted and received through the vibration damper 118.

The first absorber 119 is made of a material having an elastic modulus less than an elastic modulus of each of the piezoelectric element 114p and the multilayer piezoelectric element 116. For example, the first absorber 119 can be made of a high-polymer material. Specifically, the first absorber 119 can be made of soft resin such as urethane, or a potting material such as rubber or silicon, or the like. The first absorber 119 is located between the housing 131 and each of the multilayer piezoelectric element 116 of the transmitting device 111, the piezoelectric element 114p of the receiving device 112p, and piezoelectric elements (not shown) of the receiving devices 112q, 112r. Each piezoelectric element is surrounded by the first absorber 119.

Even when impact force is applied to the transmitting device 111 and the receiving devices 112p-112r, for example, by a small stone hit against the vibration damper 118 during running of the vehicle, the first absorber 119 absorbs the impact force. Further, the first absorber 119 helps prevent the transmitting device 111 and the receiving devices 112p-112r from being displaced toward a bottom 131a of the housing 131. In this way, the first absorber 119 protects the transmitting device 111 and the receiving devices 112p-112r from the impact force. Further, since each piezoelectric element is surrounded by the first absorber 119, each piezoelectric element can be surely protected from environmental factors such as water and dust. Accordingly, the reliability of the ultrasonic sensor 110 can be improved.

The vibration isolator 190 is shaped like a plate and made of a material having a higher elastic modulus and a higher acoustic impedance than the first absorber 119. The vibration isolator 190 is located between the transmitting device 111 and each of the receiving devices 112p, 112r, which are located adjacent to the transmitting device 111. The vibration isolator 190 stands on the bottom 131a of the housing 131 to partition an inner space of the housing 131. As shown in FIG. 14A, the transmitting device 111 is enclosed with the vibration isolator 190 and a side wall of the housing 31. Thus, the transmitting device 111 is isolated by the vibration isolator 190 from the receiving devices 112p-112r. The vibration isolator 190 is fixed to the vibration damper 118 at one end and fixed to the first absorber 119 at the other end. The thickness of the vibration isolator 190 is determined to suitably reduce the propagation of the ultrasonic wave from the multilayer piezoelectric element 116 to the acoustic matching members 113p-113r. Further, the thickness of the vibration isolator 190 is determined to suitably reduce interference of the vibration isolator 190 with the acoustic matching members 113p-113r at the vibration damper 118.

The ultrasonic sensor 110 detects the obstacle as follows. Firstly, the circuit device of the ultrasonic sensor 110 receives from the ECU of the vehicle a control signal for controlling pressure and phase of an ultrasonic wave to be transmitted. The circuit device outputs a voltage signal to the multilayer piezoelectric element 116 according to the control signal. The multilayer piezoelectric element 116 vibrates according to the control signal so as to emit the ultrasonic wave having the controlled pressure and phase.

In the fourth embodiment, the multilayer piezoelectric element 116 has a five-layered structure. Therefore, pressure of the ultrasonic wave emitted by the multilayer piezoelectric element 116 can be five times greater than that of the ultrasonic wave emitted by a single-layer piezoelectric element. Thus, the multilayer piezoelectric element 116 can emit the ultrasonic wave of high pressure.

The vibration isolator 190, which isolates the transmitting device 111 from the receiving devices 112p-112r, has the higher elastic modulus and the higher acoustic impedance than the first absorber 119. Therefore, the ultrasonic wave emitted by the multilayer piezoelectric element 116 is reflected at an interface between the first absorber 119 and the vibration isolator 190. In this way, although pressure of the ultrasonic wave emitted by the multilayer piezoelectric element 116 is high, the vibration isolator 190 can suitably reduce the propagation of the ultrasonic wave from the transmitting device 111 to the receiving devices 112p-112r. Accordingly, the vibration noise originating from the propagation can be reduced.

The ultrasonic wave emitted by the multilayer piezoelectric element 116 propagates through the acoustic matching member 113 and is then transmitted through the transmitting surface 113s. The transmitted ultrasonic wave is reflected from the obstacle and received through the receiving surfaces 113j of the acoustic matching members 113p-113r. For example, the ultrasonic wave received through the receiving surface 113j of the acoustic matching member 113p propagates through the acoustic matching member 113p to the piezoelectric element 114p and is converted to a voltage signal by the piezoelectric element 114p. The piezoelectric element 114p outputs the voltage signal to the circuit device. The circuit device processes the voltage signal and outputs the processed signal to the ECU.

For example, the distance between the ultrasonic sensor 110 and the obstacle can be measured based on a time elapsed from when the ultrasonic wave is transmitted to when the ultrasonic wave is received. Further, since the receiving devices 112p-112r are arranged in an array, the position of the obstacle can be detected based on a time difference or a phase difference between the ultrasonic waves received by the receiving devices 112p-112r.

The vibration damper 118 is interposed among the acoustic matching members 113p-113r. The ultrasonic wave is divided by the acoustic matching members 113p-113r. The divided ultrasonic waves propagate to the receiving devices 112p-112r through the acoustic matching members 113p-113r, respectively. Therefore, good crosstalk characteristics are achieved so that the ultrasonic sensor 110 can accurately detect the ultrasonic wave.

Modification of Fourth Embodiment

The fourth embodiment can be modified, for example, as follows. The acoustic matching members 113, 113p-113r can be fixed by the vibration damper 118 to the housing 131 at side surfaces near the receiving surfaces 113j and the transmitting surface 113s such that the receiving surfaces 113j and the transmitting surface 113s are exposed outside. In this case, a coating or the like can be applied to the exposed receiving surfaces 113j and transmitting surface 113s.

The vibration isolator 190 can be integrally formed with the housing 131. That is, the housing 131 and the vibration isolator 190 can be formed as a single piece. In such an approach, the number of parts of the ultrasonic sensor 110 can be reduced, and the vibration isolator 190 can be accurately positioned in the housing 131.

Figure 15:
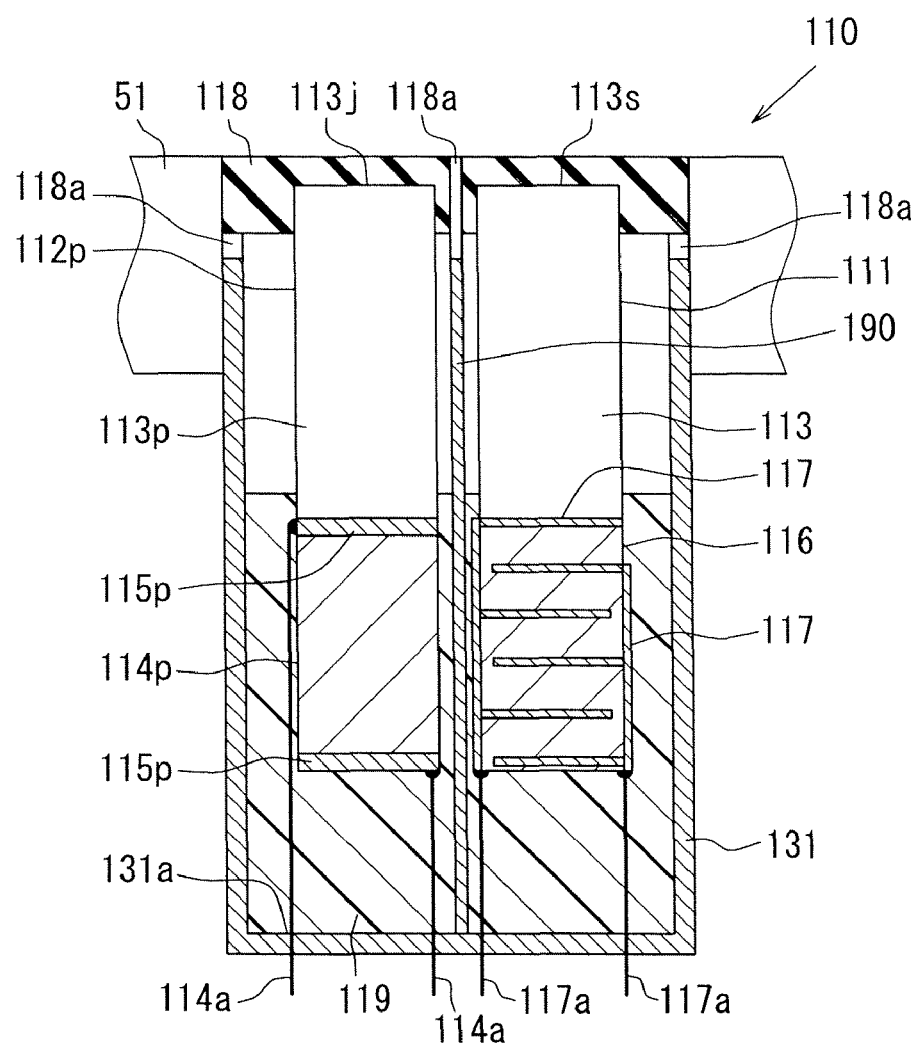
FIG. 15 is a diagram illustrating a cross-sectional view of an ultrasonic sensor according to a modification of the fourth embodiment.

As shown in FIG. 15, the vibration damper 118, the housing 131, and the vibration isolator 190 can be joined together by a joint 118a. In such an approach, the transmitting device 111 and the receiving devices 112p-112r can be accurately positioned with respect to the housing 131 and the vibration isolator 190. For example, the joint 118a can be formed by a two-color (two-material) molding method, a thermocompression bonding method, a laser welding method, a vulcanization bonding method, an adhesive agent, or the like.

Figure 16:
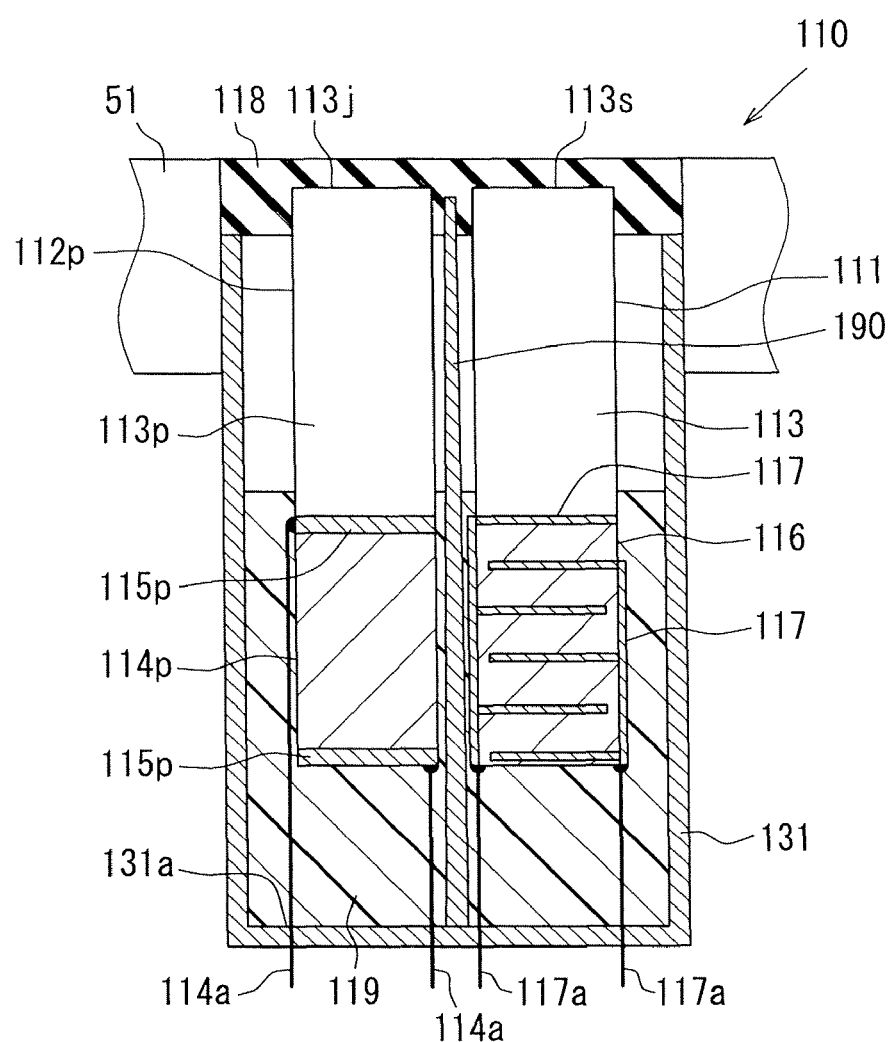
FIG. 16 is a diagram illustrating a cross-sectional view of an ultrasonic sensor according to another modification of the fourth embodiment.

The vibration isolator 190 can have a smaller thickness on the acoustic matching member side than on the piezoelectric element side. For example, as shown in FIG. 16, the vibration isolator 190 can be trapezoidal in cross section. In such an approach, the interference of the vibration isolator 190 to the acoustic matching members 113p-113r at the vibration damper 118 can be reduced, and strength of the vibration isolator 190 can be increased. For another example, the vibration isolator 190 can be formed with two plates joined together such that the vibration isolator 190 can have a step shape in cross section.

Figure 17:
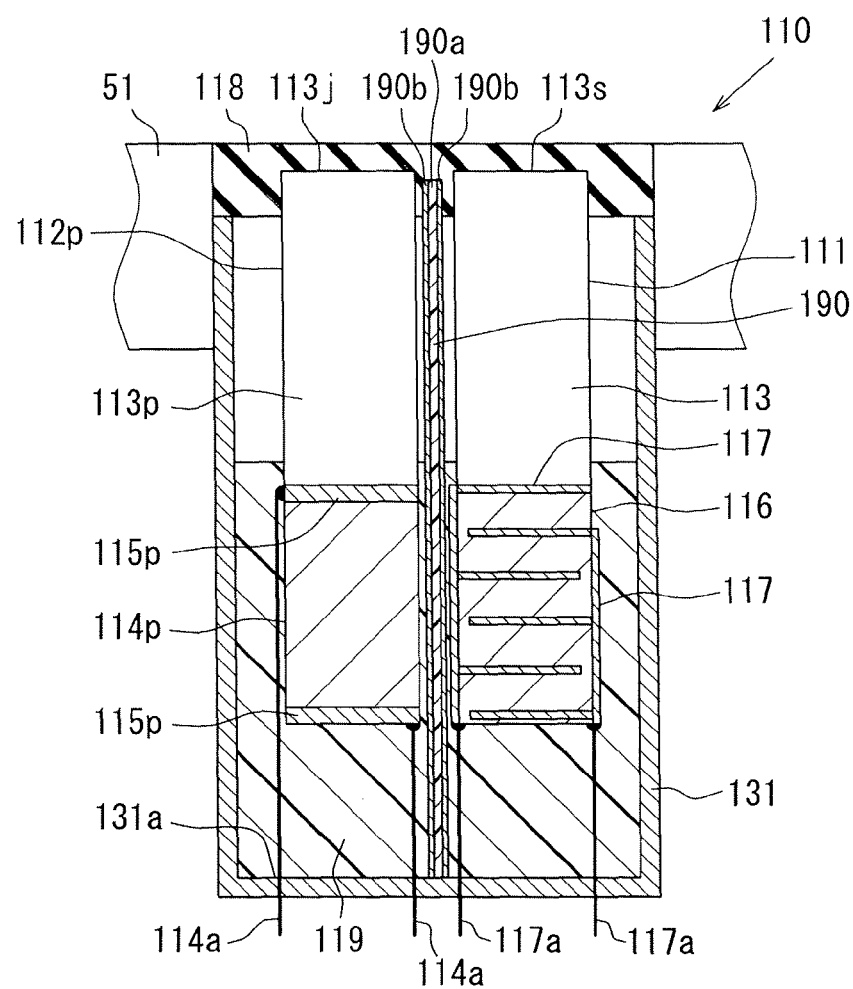
FIG. 17 is a diagram illustrating a cross-sectional view of an ultrasonic sensor according to another modification of the fourth embodiment.

The vibration isolator 190 can have a layer structure in which a soft material is sandwiched between solid materials. For example, as shown in FIG. 17, the vibration isolator 190 can be constructed with metal plates 190b and a resin layer 190a sandwiched between the metal plates 190b. In such an approach, even when the ultrasonic wave is not reflected by the metal plates 190b, the resin layer 190a damps the ultrasonic wave passing through the metal plates 190b. Thus, the vibration noise originating from the propagation of the ultrasonic wave from the transmitting device 111 to the receiving devices 112p-112r can be reduced.

The shape of the first absorber 119 can vary depending on the intended use. For example, the first absorber 119 can be formed only between the bottom 131a of the housing 131 and each of the piezoelectric elements of the transmitting device 111 and the receiving devices 112p-112r. Alternatively, the inner space of the housing 131 can be filled with the first absorber 119.

The acoustic matching member 113, 113p-113r can have a shape other a rectangular cylinder with a squire cross section. For example, the acoustic matching members 113, 113p-113r can have a circular cylinder with a circular cross section. In such an approach, unwanted vibrations in the acoustic matching members 113, 113p-113r can be suitably reduced.

The number and arrangement of the transmitting device and the receiving devices can vary depending on the intended use. For example, when the ultrasonic sensor 110 is designed to measure the distance, the ultrasonic sensor 110 needs at least one transmitting device and one receiving device. For another example, when the ultrasonic sensor 110 is designed to measure the direction, the ultrasonic sensor 110 needs at least one transmitting device and two receiving devices.

Like the transmitting device 111, the receiving devices 112p-112r can have a multilayer structure.

As described above, according to the fourth embodiment, the ultrasonic sensor 110 can have the following advantages.

(1) The transmitting device 111 employs the multilayer piezoelectric element 116. Therefore, the transmitting device 111 can transmit the ultrasonic wave of high pressure. Since the transmitting device 111 is isolated from the receiving devices 112p-112r by the vibration isolator 190, the vibration noise originating from the propagation of the ultrasonic wave from the transmitting device 111 to the receiving devices 112p-112r can be reduced. Thus, the ultrasonic sensor 110 can achieve both high pressure ultrasonic wave and low vibration noise.

(2) The first absorber 119 protects the transmitting device 111 and the receiving devices 112p-112r from the external force applied to the ultrasonic sensor 110. Since the vibration isolator 190 has the higher acoustic impedance than the first absorber 119, the ultrasonic wave emitted by the multilayer piezoelectric element 116 is reflected at the interface between the first absorber 119 and the vibration isolator 190. Thus, even when the emitted ultrasonic wave has high pressure, the vibration isolator 190 can suitably reduce the propagation of the ultrasonic wave from the transmitting device 111 to the receiving devices 112p-112r. Accordingly, the vibration noise originating from the propagation can be reduced.

(3) The vibration isolator 190 can be integrally formed with the housing 131. In such an approach, the number of parts of the ultrasonic sensor 110 can be reduced, and the vibration isolator 190 can be accurately positioned in the housing 131.

(4) The vibration isolator 190 can have a smaller thickness on the acoustic matching member side than on the piezoelectric element side. In such an approach, the interference of the vibration isolator 190 to the acoustic matching members 113p-113r at the vibration damper 118 can be reduced, and the strength of the vibration isolator 190 can be increased.

(5) The vibration isolator 190 can have a layer structure in which a soft material is sandwiched between solid materials. In such an approach, even when the ultrasonic wave emitted by the transmitting device 111 is not reflected by the solid materials, the soft material damps the ultrasonic wave passing through the solid materials. Thus, the vibration noise originating from the propagation of the ultrasonic wave can be reduced.

(6) The transmitting surface 113s and the receiving surfaces 113j are covered with the vibration damper 118. In such an approach, the transmitting device 111 and the receiving devices 112p-112r can be surely protected from environmental factors such as water and dust. Accordingly, the reliability of the ultrasonic sensor 110 can be improved.

Fifth Embodiment

An ultrasonic sensor 120 according to a fifth embodiment of the present invention is described below with reference to FIG. 18. Differences between the fourth and fifth embodiments are as follows.

Figure 18:
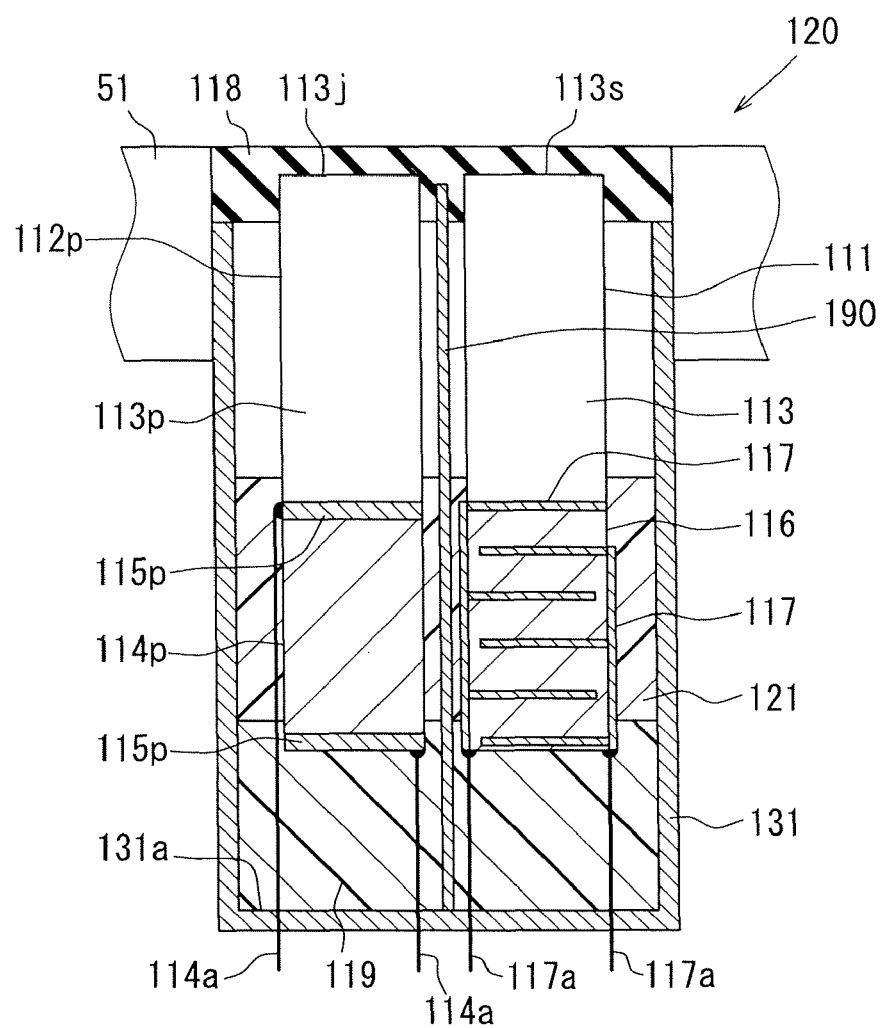
FIG. 18 is a diagram illustrating a cross-sectional view of an ultrasonic sensor according to a fifth embodiment of the present invention.

As shown in FIG. 18, the ultrasonic sensor 120 has a second absorber 121 in addition to the first absorber 119. The second absorber 121 is made of a material having a lower elastic modulus and a lower acoustic impedance than the first absorber 119. For example, the second absorber 121 can be made of gel. The first absorber 119 is placed between the bottom 131a of the housing 131 and each of the piezoelectric elements of the transmitting device 111 and the receiving devices 112*p*-112*r*. The second absorber 121 is placed on the first absorber 119 to surround the piezoelectric elements of the transmitting device 111 and the receiving devices 112*p*-112*r*.

Even when the external force is applied to the transmitting device 111 and the receiving devices 112*p*-112*r* through the vibration damper 118, the first absorber 119 absorbs the external force. Since each piezoelectric element is surrounded by the second absorber 121, each piezoelectric element can be surely protected from environmental factors such as water and dust. Accordingly, the reliability of the ultrasonic sensor 110 can be improved. Further, since the second absorber 121 placed near the acoustic matching members 113, 113*p*-113*r* has the lower elastic modulus than the first absorber 119, the damping of the ultrasonic wave in the acoustic matching members 113, 113*p*-113*r* can be reduced.

Modification of Fifth Embodiment

Figure 19:
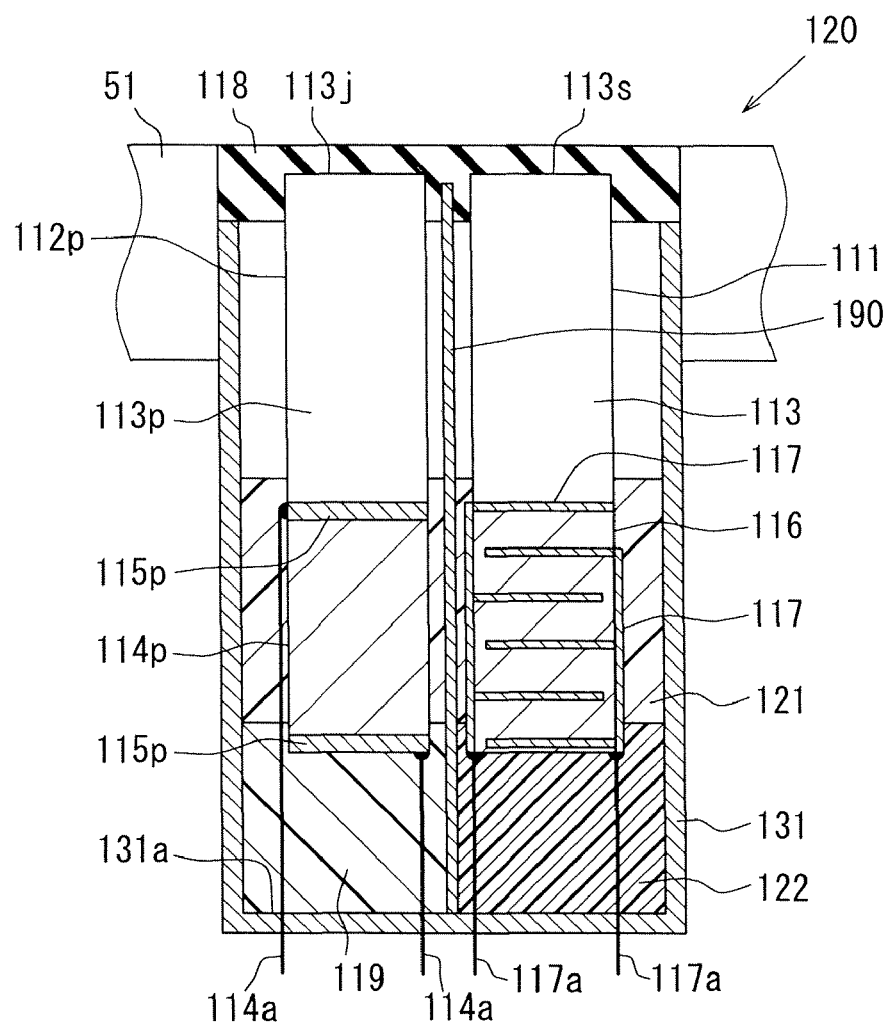
FIG. 19 is a diagram illustrating a cross-sectional view of an ultrasonic sensor according to a modification of the fifth embodiment.

The fifth embodiment can be modified, for example, as follows. An absorber placed between the bottom 131*a* of the housing 131 and each of the receiving devices 112*p*-112*r* can have an elastic modulus different than that of an absorber placed between the bottom 131*a* and the transmitting device 111. Specifically, as shown in FIG. 19, a third absorber 122 can be placed between the multilayer piezoelectric element 116 and the bottom 131*a*. The third absorber 122 has a higher elastic modulus than the first absorber 119. In such an approach, the multilayer piezoelectric element 116 can effectively emit the ultrasonic wave.

Figure 20:
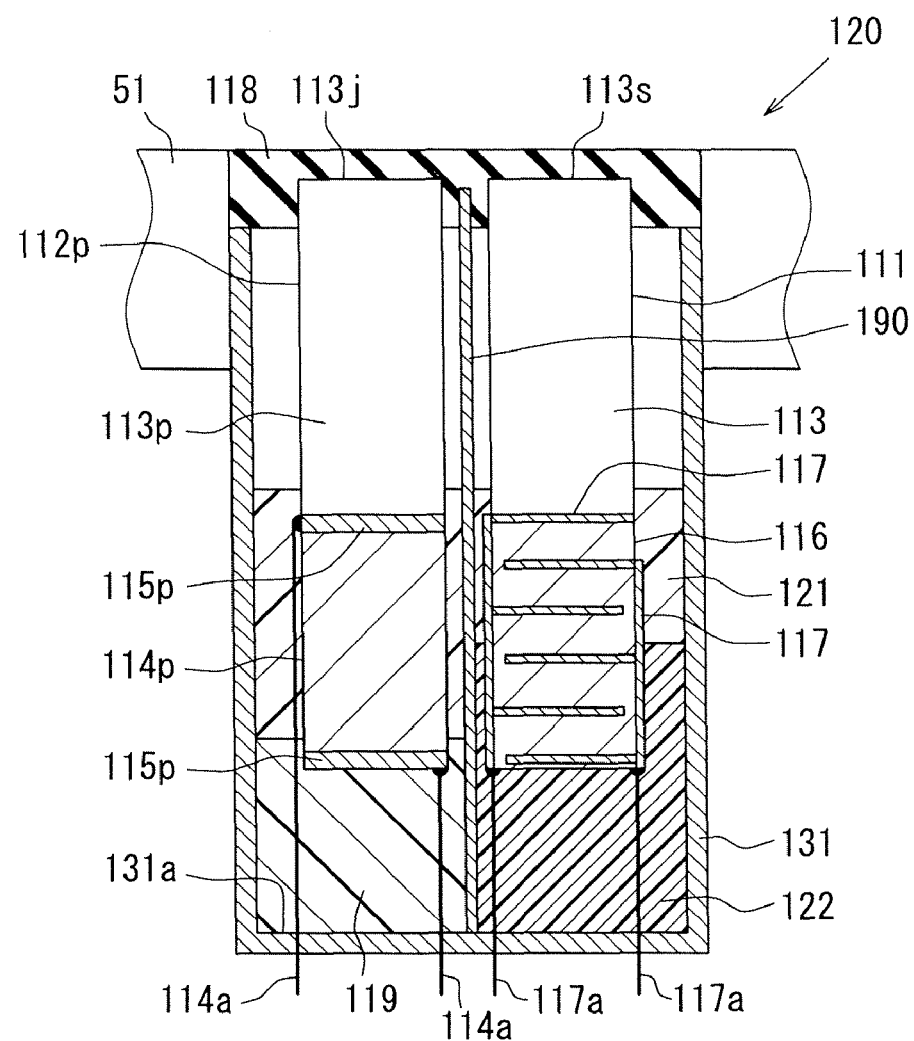
FIG. 20 is a diagram illustrating a cross-sectional view of an ultrasonic sensor according to another modification of the fifth embodiment.

Further, as shown in FIG. 20, the third absorber 122 can have a greater height, measured from the bottom 131*a*, than the first absorber 119. In such an approach, a lateral vibration of the multilayer piezoelectric element 116 is restricted so that the multilayer piezoelectric element 116 can effectively emit the ultrasonic wave.

As described above, according to the fifth embodiment, the ultrasonic sensor 120 can have the following advantages.

(1) The ultrasonic sensor 120 has the second absorber 121 in addition to the first absorber 119. The second absorber 121 has the lower elastic modulus than the first absorber 119. The first absorber 119 is placed between the bottom 131*a* of the housing 131 and each of the piezoelectric elements of the transmitting device 111 and the receiving devices 112*p*-112*r*. The second absorber 121 is placed on the first absorber 119 to surround the piezoelectric elements of the transmitting device 111 and the receiving devices 112*p*-112*r*. The external force applied to the transmitting device 111 and the receiving devices 112*p*-112*r* through the vibration damper 118 can be absorbed by the first absorber 119. The piezoelectric elements are surrounded by the second absorber 121 so that the piezoelectric elements can be protected from environmental factors such as water and dust. Since the second absorber 121 has the lower elastic modulus than the first absorber 119, the damping of the ultrasonic wave in the acoustic matching members 113, 113*p*-113*r* can be reduced.

(2) The third absorber 122 can be placed between the multilayer piezoelectric element 116 and the bottom 131*a*. Since the third absorber 122 has the higher elastic modulus than the first absorber 119, the multilayer piezoelectric element 116 can effectively emit the ultrasonic wave.

(3) The third absorber 122 can have the height greater than that of the first absorber 119. In such an approach, the lateral vibration of the multilayer piezoelectric element 116 is restricted so that the multilayer piezoelectric element 116 can effectively emit the ultrasonic wave.

Sixth Embodiment

An ultrasonic sensor 130 according to a sixth embodiment of the present invention is described below with reference to FIG. 21A. Differences between the fourth and sixth embodiments are as follows.

Figure 21A:
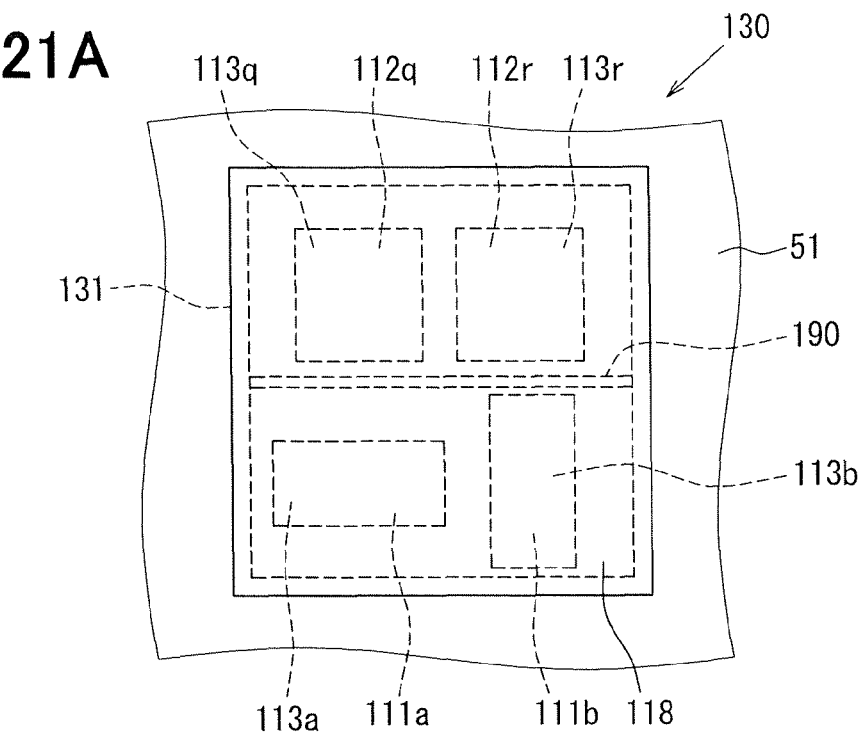
FIG. 21A is a diagram illustrating a top view of an ultrasonic sensor according to a sixth embodiment of the present invention.

As shown in FIG. 21A, the ultrasonic sensor 130 includes two transmitting devices 111*a*, 111*b* and two receiving devices 112*q*, 112*r*. The receiving devices 112*q*, 112*r* are arranged side by side in the horizontal direction. The transmitting devices 111*a*, 111*b* are located below the receiving devices 112*q*, 112*r* and arranged side by side in the horizontal direction. The transmitting devices 111*a*, 111*b* are isolated from the receiving devices 112*q*, 112*r* by the vibration isolator 190 so that the propagation of the ultrasonic wave from the transmitting devices 111*a*, 111*b* to the receiving devices 112*q*, 112*r* can be reduced.

An acoustic matching member 113*a* of the transmitting device 111*a* has a rectangular cross section having a length (i.e., long side) in the horizontal direction and a width (i.e., short side) in a vertical direction. Therefore, the transmitting device 111*a* has a larger directivity in the vertical direction.

On the other hand, an acoustic matching member 113*b* of the transmitting device 111*b* has a rectangular cross section having a length in the vertical direction and a width in the horizontal direction. Therefore, the transmitting device 111*b* has a larger directivity in the horizontal direction.

In summary, the transmitting devices 111*a*, 111*b* have different directivities. The ultrasonic sensor 130 can switch between the transmitting devices 111*a*, 111*b* according to road conditions, for example. In the sixth embodiment, the transmitting devices 111*a*, 111*b* alternately transmit the ultrasonic wave. When the transmitting device 111*a* transmits the ultrasonic wave, the ultrasonic sensor 130 can detect the obstacle near the ground (i.e., road surface). When the transmitting device 111*b* transmits the ultrasonic wave, the ultrasonic sensor 130 can detect the obstacle over a wide horizontal range of area.

When the road conditions are bad, the ultrasonic wave reflected from the road surface is large. Therefore, when the road conditions are bad, the ultrasonic sensor 130 may not detect the obstacle based on the ultrasonic wave transmitted by the transmitting device 111*a*, which has the vertical directivity. In such a case, the ultrasonic sensor 130 may detect the obstacle based on the ultrasonic wave transmitted by the transmitting device 111*b*, which has the horizontal directivity. Conversely, the ultrasonic sensor 130 may detect the obstacle based on the ultrasonic wave transmitted by the transmitting device 111*a*, when the ultrasonic sensor 130 cannot detect the obstacle based on the ultrasonic wave transmitted by the transmitting device 111*b*. In this way, the transmitting devices 111*a*, 111*b* work complementarily to each other so that the ultrasonic sensor 130 can detect the obstacle with high sensitivity over a wide range of area.

Modification of Six Embodiment

Figure 21B:
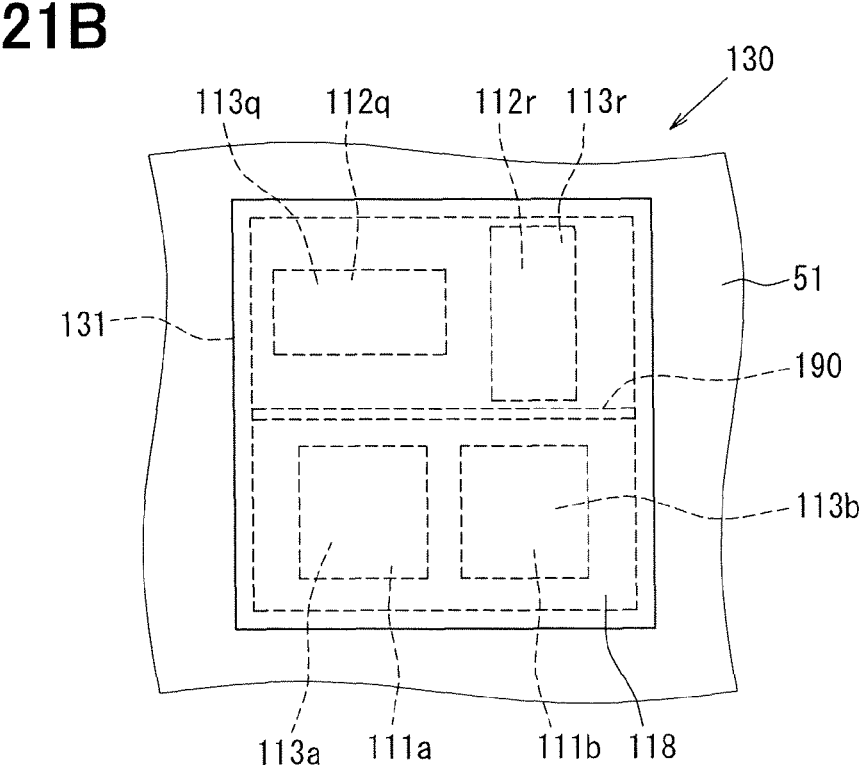
FIG. 21B is a diagram illustrating a top view of an ultrasonic sensor according to a modification of the sixth embodiment.

The sixth embodiment can be modified, for example, as follows. As shown in FIG. 21B, the receiving devices 112*q*, 112*r* can have different directivities. An acoustic matching member 113*q* of the receiving device 112*q* has a rectangular cross section having a length in the horizontal direction and a width in the vertical direction. Therefore, the receiving device 112*q* has a larger directivity in the vertical direction. On the other hand, an acoustic matching member 113r of the receiving device 112r has a rectangular cross section having a length in the vertical direction and a width in the horizontal direction. Therefore, the receiving device 112r has a larger directivity in the horizontal direction. The ultrasonic sensor 130 can switch between the receiving devices 112q, 112r according to road conditions, for example.

The number and arrangement of the transmitting devices and receiving devices can vary depending on the intended use.

As described above, according to the ultrasonic sensor 130 of the sixth embodiment, a set of transmitting devices or a set of receiving devices have different directivities. Therefore, the ultrasonic sensor 130 can detect the obstacle with high sensitivity over a wide range by changing the directivities according to conditions such as road conditions.

Seventh Embodiment

An ultrasonic sensor 140 according to a fourth embodiment of the present invention is described below with reference to FIG. 22. Differences between the fourth and seventh embodiments are as follows.

Figure 22:
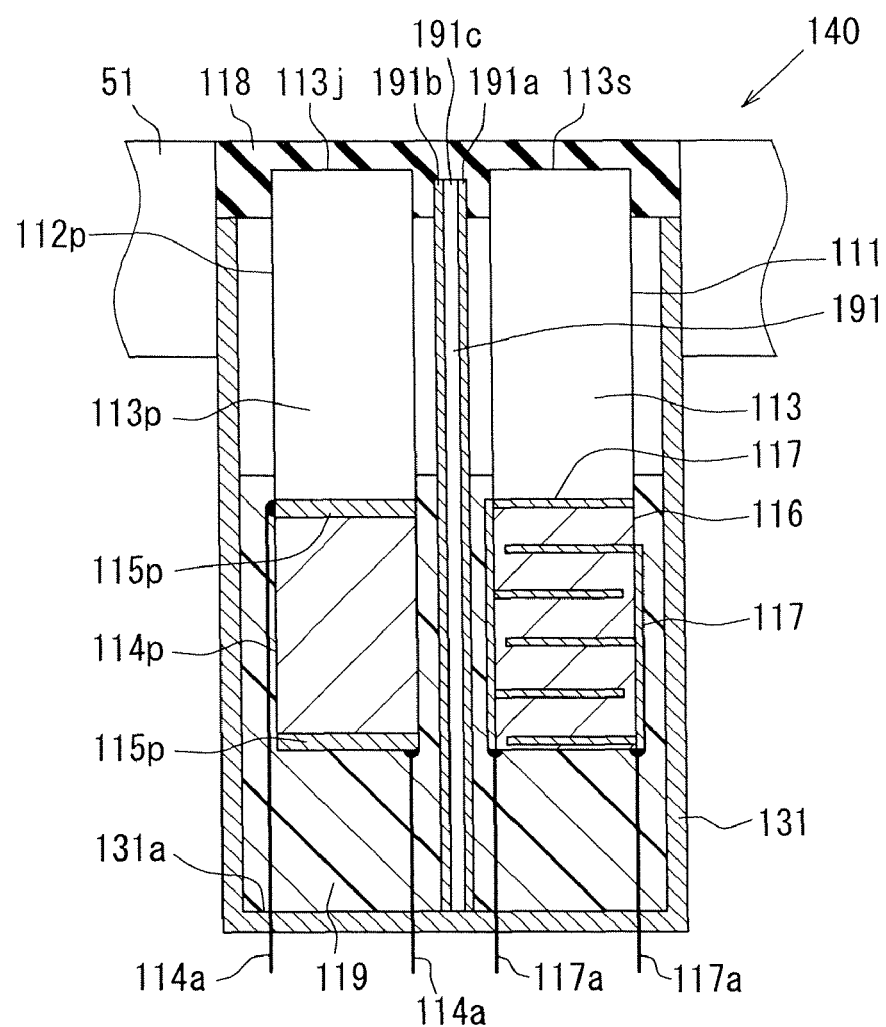
FIG. 22 is a diagram illustrating a cross-sectional view of an ultrasonic sensor according to a seventh embodiment of the present invention.

As shown in FIG. 22, the ultrasonic sensor 140 has a vibration isolator 191 instead of the vibration isolator 190. The vibration isolator 191 includes a first plate 191a, a second plate 191b, and a core layer 191c sandwiched between the first and second plates 191a, 191b. Each of the first and second plates 191a, 191b has a higher acoustic impedance than the core layer 191c.

Therefore, an acoustic impedance difference is large at an interface between the first plate 191a and the core layer 191c and at an interface between the second plate 191b and the core layer 191c. Thus, the ultrasonic wave from the transmitting device 111 is easily reflected at each interface so that the propagation of the ultrasonic wave from the transmitting device 111 to the receiving devices 112p-112r can be reduced.

Modification of Seventh Embodiment

Figure 23:
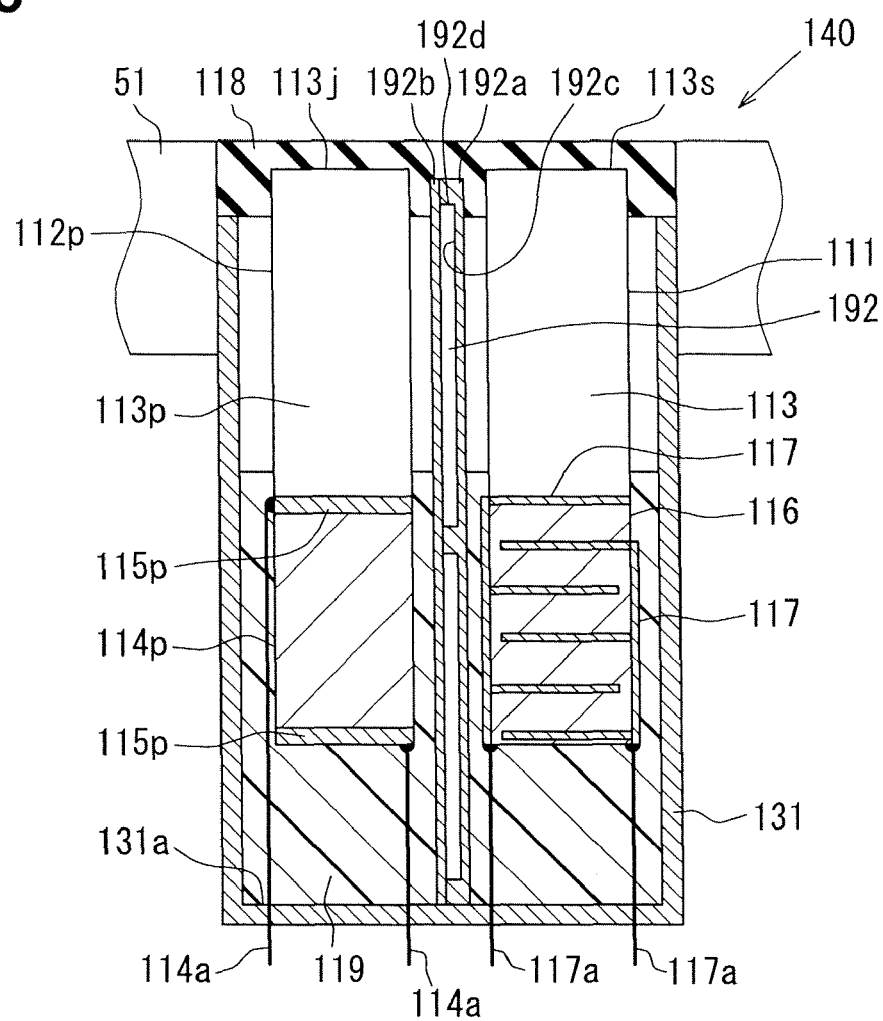
FIG. 23 is a diagram illustrating a cross-sectional view of an ultrasonic sensor according to a modification of the seventh embodiment.

The seventh embodiment can be modified, for example, as follows. As shown in FIG. 23, the ultrasonic sensor 140 can have a vibration isolator 192 instead of the vibration isolator 191. The vibration isolator 192 includes a first plate 192a and a second plate 192b. The first plate 192a and the second plate 192b are joined together such that a sealed space 192c can be provided between the first plate 192a and the second plate 192b. The sealed space 192c is filled with a sealed member 192d. Each of the first and second plates 192a, 192b has a higher acoustic impedance than the sealed member 192d. For example, as shown in FIG. 23, the first plate 192a has projections that are in contact with the second plate 192b to provide the sealed space 192c.

In such an approach, an acoustic impedance difference can be large at an interface between the first plate 192a and the sealed member 192d and at an interface between the second plate 192b and the sealed member 192d. Thus, the ultrasonic wave from the transmitting device 111 is easily reflected at each interface so that the propagation of the ultrasonic wave from the transmitting device 111 to the receiving devices 112p-112r can be reduced. For example, the sealed member 192d can be gel or gas such as air. Gas has high compressibility, and gel has large damping constant. Therefore, the sealed member 192d can suitably absorb the propagation of the ultrasonic wave from the transmitting device 111 to the receiving devices 112p-112r.

The vibration isolator 192 can further include a honeycomb member (not shown) placed in the sealed space 192c to partition the sealed space 192c. In such an approach, the propagation of the ultrasonic wave from the transmitting device 111 to the receiving devices 112p-112r can be efficiently reduced. Further, strength of the vibration isolator 192 can be increased.

Figure 24:
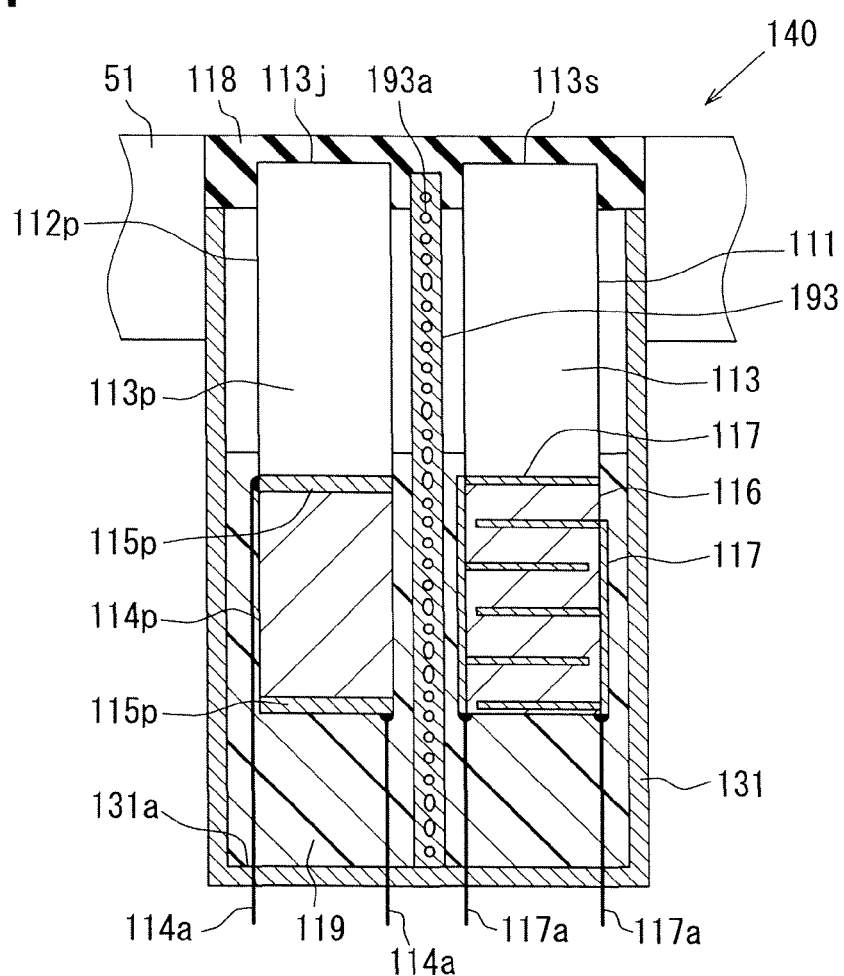
FIG. 24 is a diagram illustrating a cross-sectional view of an ultrasonic sensor according to another modification of the seventh embodiment.

Alternatively, as shown in FIG. 24, the ultrasonic sensor 140 can have a vibration isolator 193 instead of the vibration isolator 191. The vibration isolator 193 has a trapped gas bubble 193a. An acoustic impedance difference in the vibration isolator 193 can be large at the trapped gas bubble 193a. Therefore, the ultrasonic wave from the transmitting device 111 is easily reflected at the trapped gas bubble 193a so that the propagation of the ultrasonic wave from the transmitting device 111 to the receiving devices 112p-112r can be reduced. The vibration isolator 193 can be easily manufactured compared to the other vibration isolators. Therefore, manufacturing cost of the ultrasonic sensor 140 can be reduced.

As described above, according to the seventh embodiment, the ultrasonic sensor 140 can have the following advantages.

(1) The vibration isolator 191 includes the first plate 191a, the second plate 191b, and the core layer 191c sandwiched between the first and second plates 191a, 191b. Each of the first and second plates 191a, 191b has the higher acoustic impedance than the core layer 191c. Therefore, the acoustic impedance difference in the vibration isolator 191 is large at the interface between the first plate 191a and the core layer 191c and at the interface between the second plate 191b and the core layer 191c. Thus, the ultrasonic wave from the transmitting device 111 is easily reflected at each interface so that the propagation of the ultrasonic wave from the transmitting device 111 to the receiving devices 112p-112r can be reduced.

(2) The ultrasonic sensor 140 can have the vibration isolator 192 instead of the vibration isolator 191. The vibration isolator 192 includes the first plate 192a, the second plate 192b, and the sealed space 192c filled with the sealed member 192d. Each of the first and second plates 192a, 192b has the higher acoustic impedance than the sealed member 192d. The acoustic impedance difference in the vibration isolator 192 can be large at the interface between the first plate 192a and the sealed member 192d and at the interface between the second plate 192b and the sealed member 192d. Thus, the ultrasonic wave from the transmitting device 111 is easily reflected at each interface so that the propagation of the ultrasonic wave from the transmitting device 111 to the receiving devices 112p-112r can be reduced. The sealed member 192d can be gel or gas such as air. Gas has high compressibility, and gel has large damping constant. Therefore, the sealed member 192d can suitably absorb the propagation of the ultrasonic wave.

(3) The vibration isolator 192 can further include the honeycomb layer (not shown) placed in the sealed space 192c to partition the sealed space 192c. In such an approach, the propagation of the ultrasonic wave from the transmitting device 111 to the receiving devices 112p-112 can be efficiently reduced, and the strength of the vibration isolator 192 can be increased.

(4) The ultrasonic sensor 140 can have the vibration isolator 193 instead of the vibration isolator 191. The vibration isolator 193 has the trapped gas bubble 193a. The acoustic impedance difference in the vibration isolator 193 can be large at the trapped gas bubble 193a. Therefore, the ultrasonic wave from the transmitting device 111 is easily reflected at the trapped gas bubble 193a so that the propagation of the ultrasonic wave from the transmitting device 111 to the receiving devices 112p-112r can be reduced. The vibration isolator 193 can be easily manufactured so that the manufacturing cost of the ultrasonic sensor 140 can be reduced.

Eighth Embodiment

An ultrasonic sensor 150 according to an eighth embodiment of the present invention is described below with reference to FIG. 25. Differences between the fourth and eighth embodiments are as follows.

Figure 25:
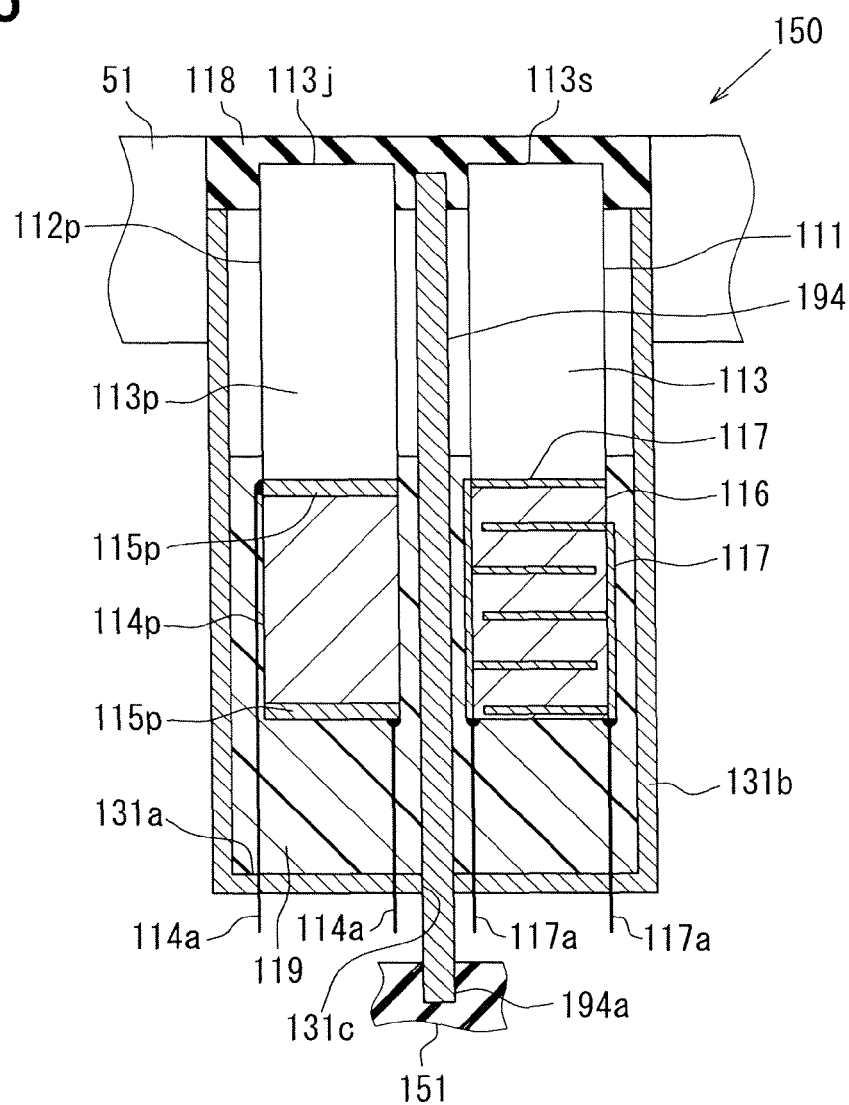
FIG. 25 is a diagram illustrating a cross-sectional view of an ultrasonic sensor according to an eighth embodiment of the present invention.

As shown in FIG. 25, the ultrasonic sensor 150 includes a housing 131b instead of the housing 131 and a vibration isolator 194 instead of the vibration isolator 190. The housing 131b has a through hole 131c on a bottom 131a. The vibration isolator 194 has an extension 194a exposed outside the housing 131b through the through hole 131c. An elastic member 151 is attached to the extension 194a to reduce a vibration of the extension 194a. For example, the elastic member 151 can be made of rubber, gel, or the like.

In such an approach, a resonance frequency of the vibration isolator 194 can be reduced. Further, since the vibration of the extension 194a is reduced by the elastic member 151, the vibration of the entire vibration isolator 194 is reduced accordingly. Thus, the propagation of the ultrasonic wave from the transmitting device 111 to the receiving devices 112p-112r can be reduced.

As described above, according to the eighth embodiment, the ultrasonic sensor 150 can have the following advantages.

(1) The vibration isolator 194 has the extension 194a exposed outside the housing 131b through the through hole 131c. Thus, the resonance frequency of the vibration isolator 194 can be reduced. Further, since the extension 194a is exposed outside the housing 131b, the vibration of the vibration isolator 194 can be effectively reduced at the extension 194a. Thus, the propagation of the ultrasonic wave from the transmitting device 111 to the receiving devices 112p-112r can be reduced.

(2) The elastic member 151 is attached to the extension 194a of the vibration isolator 194. Thus, the vibration of the extension 194a is reduced by the elastic member 151. The vibration of the entire vibration isolator 194 is reduced accordingly.

Ninth Embodiment

An ultrasonic sensor 160 according to a ninth embodiment of the present invention is described below with reference to FIG. 26. Differences between the fourth and ninth embodiments are as follows.

Figure 26:
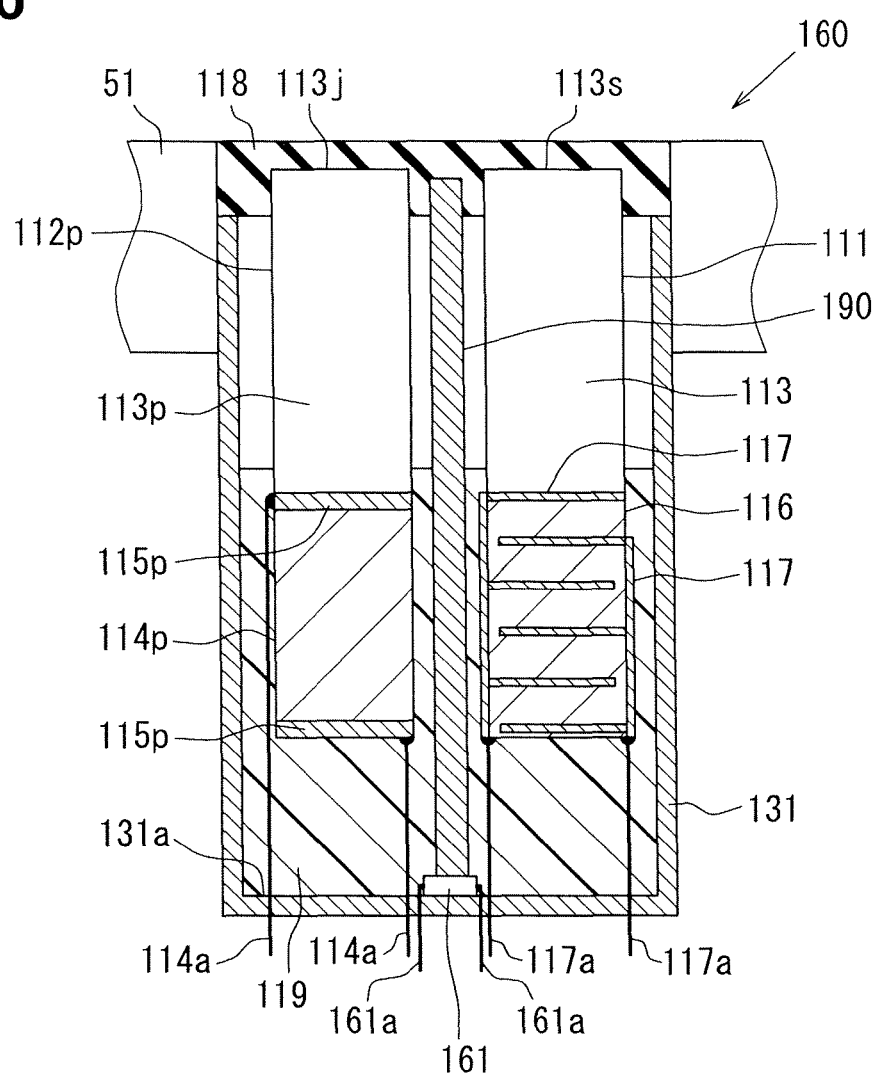
FIG. 26 is a diagram illustrating a cross-sectional view of an ultrasonic sensor according to a ninth embodiment of the present invention.

As shown in FIG. 26, the ultrasonic sensor 160 includes an actuator 161 serving as a noise chancellor. The actuator 161 is placed between the vibration isolator 190 and the bottom 131a of the housing 131. The actuator 161 is electrically coupled to the circuit device (not shown) through a wire 161a. The actuator 161 detects the vibration of the vibration isolator 190 and applies a vibration having opposite phase to the detected vibration to the vibration isolator 190, thereby damping the vibration of the vibration isolator 190. Alternatively, the vibration applied by the actuator 161 to the vibration isolator 190 can be adjusted according to pressure of the ultrasonic wave emitted by the transmitting device 111.

The actuator 161 can be placed between the bottom 131a and each of the receiving devices 112p-112r. In this case, the actuator 161 detects vibrations of the receiving devices 112p-112r and applies vibrations having opposite phase to the detected vibrations to the receiving devices 112p-112r, thereby damping the vibrations of the receiving devices 112p-112r.

As described above, according to the ninth embodiment, the ultrasonic sensor 160 includes the actuator 161 placed between the vibration isolator 190 and the bottom 131a of the housing 131. The actuator 161 detects the vibration of the vibration isolator 190 and applies the vibration having opposite phase to the detected vibration to the vibration isolator 190, thereby damping the vibration of the vibration isolator 190. Thus, the propagation of the ultrasonic wave from the transmitting device 111 to the receiving devices 112p-112r can be reduced.

Tenth Embodiment

An ultrasonic sensor 170 according to a tenth embodiment of the present invention is described below with reference to FIGS. 27A and 27B. Differences between the fourth and tenth embodiments are as follows. The ultrasonic sensor 170 has transmitting device 11 and one receiving device 112p. Alternatively, like the fourth embodiment, the ultrasonic sensor 170 can have three receiving devices 112p-112r.

Figure 27A:
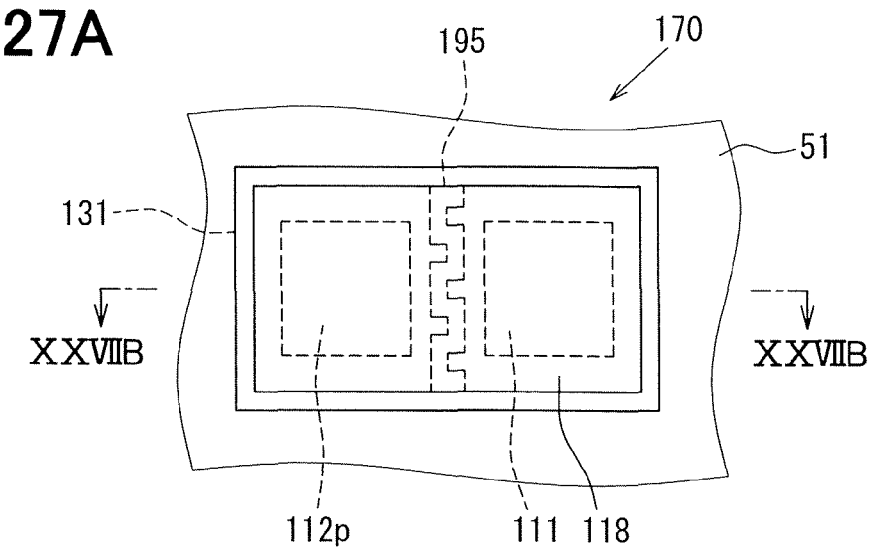
FIG. 27A is a diagram illustrating a top view of an ultrasonic sensor according to a tenth embodiment of the present invention.
Figure 27B:
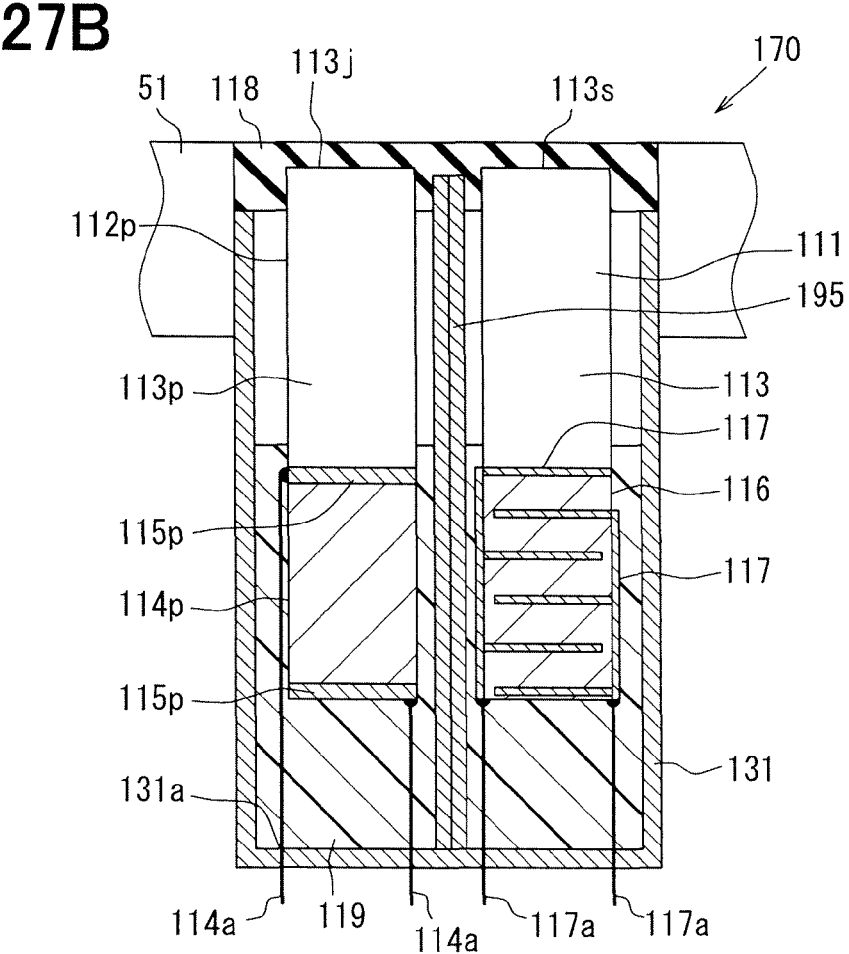
FIG. 27B is a diagram illustrating a cross-sectional view taken along line XXVIIB-XXVIIB of FIG. 27A.

As shown in FIGS. 27A and 27B, the ultrasonic sensor 170 has a vibration isolator 195 instead of the vibration isolator 190. The vibration isolator 195 has uneven side surfaces with recesses and projections.

A resonant frequency of the vibration isolator 195 depends on the shape of the uneven side surfaces. Therefore, resonance of the vibration isolator 195 can be reduced by adjusting the shape of the uneven side surfaces.

As described above, according to the ultrasonic sensor 170 of the tenth embodiment, the vibration isolator 195 has the uneven side surfaces. Since the resonant frequency of the vibration isolator 195 depends on the shape of the uneven side surfaces, the resonance of the vibration isolator 195 can be reduced by adjusting the shape of the uneven side surfaces.

Eleventh Embodiment

An ultrasonic sensor 180 according to an eleventh embodiment of the present invention is described below with reference to FIGS. 28A and 28B. Differences between the fourth and eleventh embodiments are as follows. The ultrasonic sensor 180 has one transmitting device 111 and one receiving device 112p. Alternatively, like the fourth embodiment, the ultrasonic sensor 180 can have three receiving devices 112p-112r.

Figure 28A:
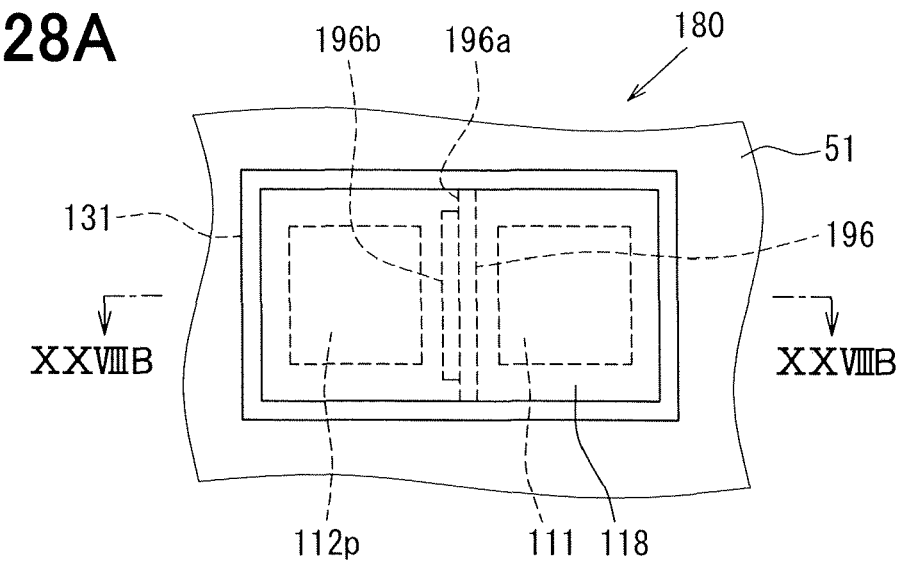
FIG. 28A is a diagram illustrating a top view of an ultrasonic sensor according to an eleventh embodiment of the present invention.
Figure 28B:
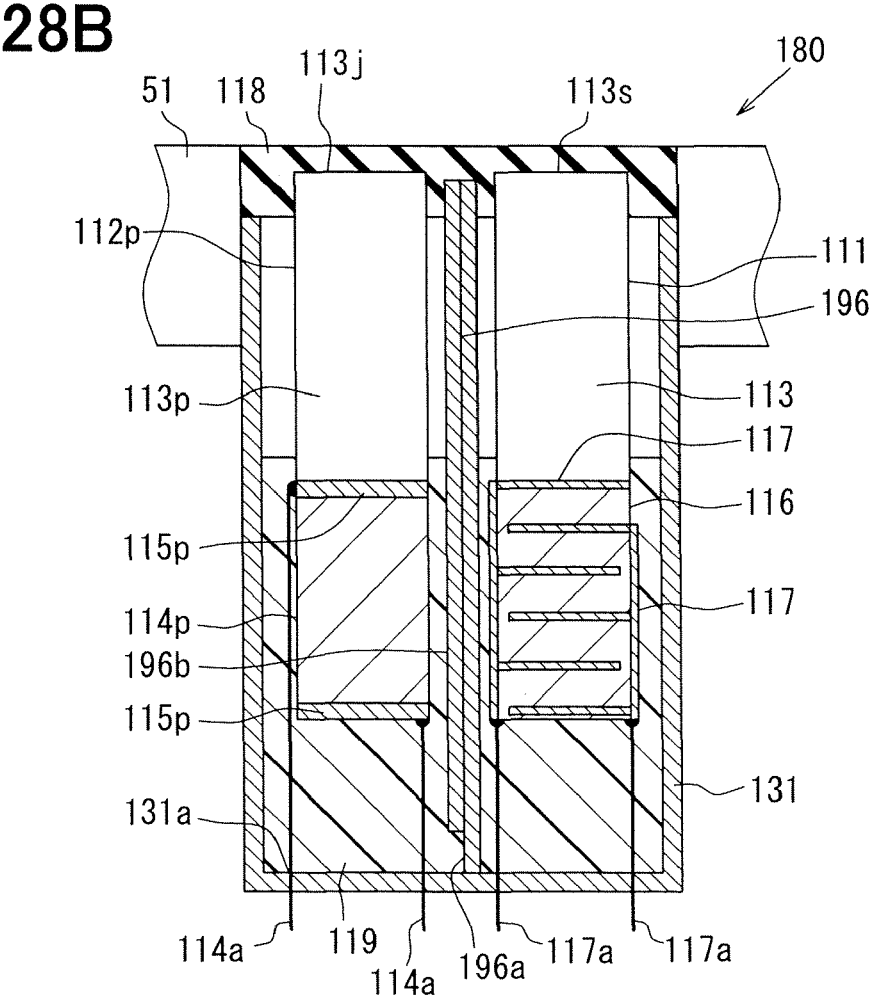
FIG. 28B is a diagram illustrating a cross-sectional view taken along line XXVIIIB-XXVIIIB of FIG. 28A.

As shown in FIGS. 28A and 28B, the ultrasonic sensor 180 has a vibration isolator 196 instead of the vibration isolator 190. The vibration isolator 196 has an edge portion 196a supported by the housing 131. The thickness of the edge portion 196a is smaller than that of a center portion 196b of the vibration isolator 196. That is, the vibration isolator 196 is supported by the housing 131 at its edge and thinner at its edge than at its center.

When the ultrasonic wave from the transmitting device 111 propagates to the vibration isolator 196, the center portion 196b is less likely to vibrate than the edge portion 196a. Therefore, the propagation of the ultrasonic wave to the receiving device 112p can be reduced.

As described above, according to the ultrasonic sensor 180 of the eleventh embodiment, the vibration isolator 196 is thinner at the edge portion 196a supported by the housing 131 than at the center portion 196b. When the ultrasonic wave from the transmitting device 111 propagates to the vibration isolator 196, the center portion 196b is less likely to vibrate than the edge portion 196a. Therefore, the propagation of the ultrasonic wave from the transmitting device 111 to the receiving device 112p can be reduced.

Twelfth Embodiment

An ultrasonic sensor 180a according to a twelfth embodiment of the present invention is described below with reference to FIGS. 29A and 29B. Differences between the fourth and twelfth embodiments are as follows. The ultrasonic sensor 180a has one transmitting device 111 and one receiving device 112p. Alternatively, like the fourth embodiment, the ultrasonic sensor 180a can have three receiving devices 112p-112r.

Figure 29A:
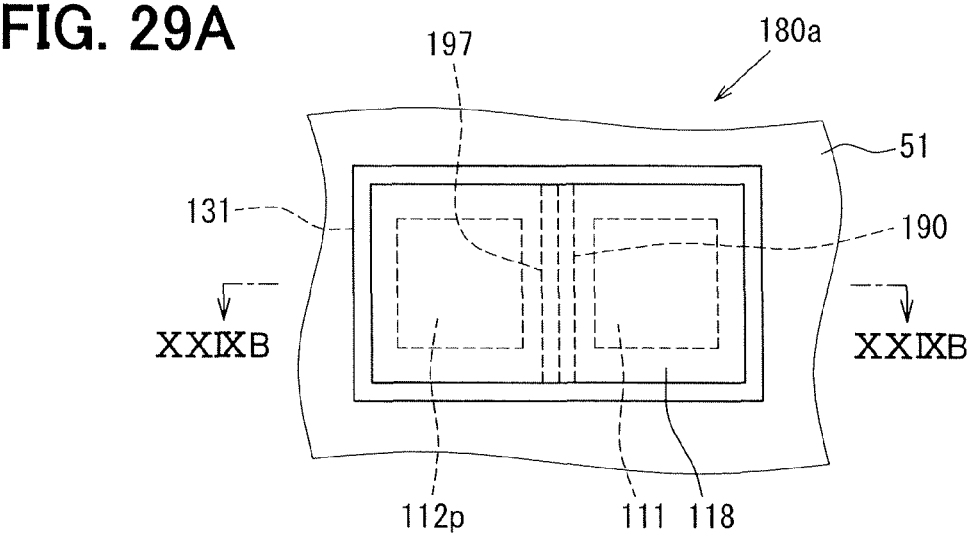
FIG. 29A is a diagram illustrating a top view of an ultrasonic sensor according to a twelfth embodiment of the present invention.
Figure 29B:
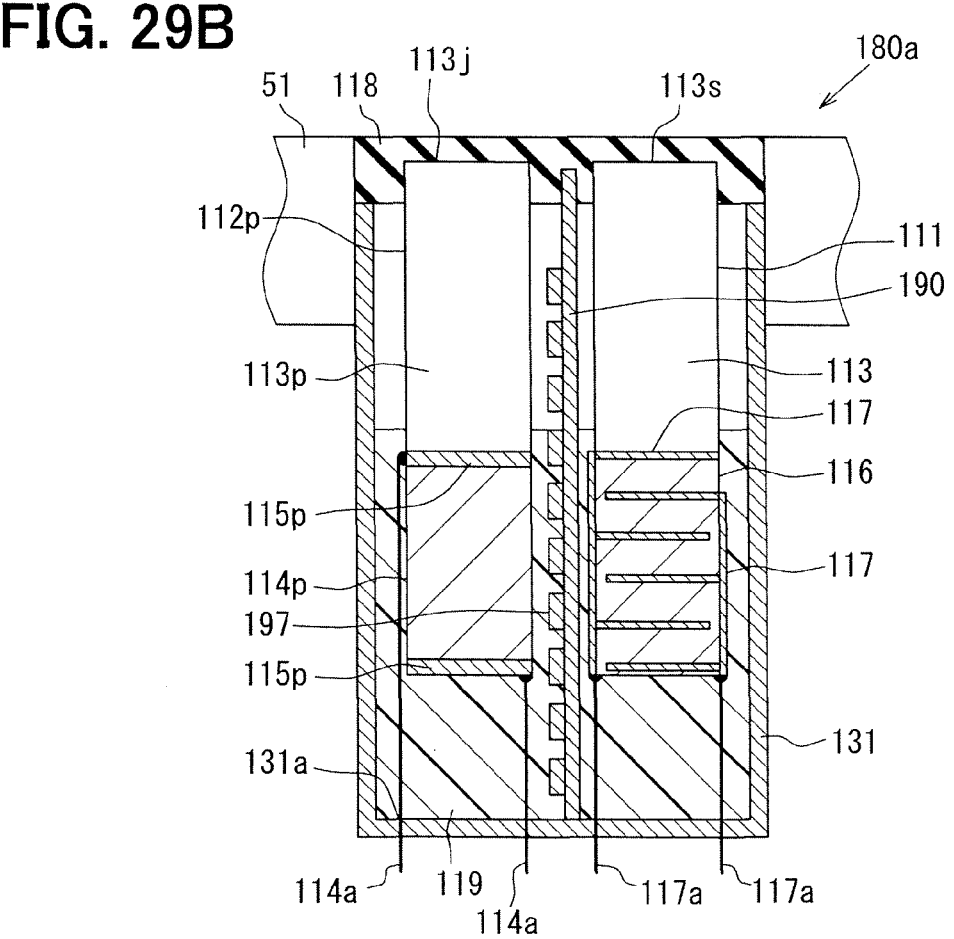
FIG. 29B is a diagram illustrating a cross-sectional view taken along line XXIXB-XXIXB of FIG. 29A.

As shown in FIGS. 29A and 29B, the vibration isolator 190 of the ultrasonic sensor 180a has reinforcements 197 on a first side surface facing the receiving device 112p. For example, the reinforcements 197 are equally spaced from each other. The vibration isolator 190 is reinforced by the reinforcements 197 so that the vibration isolator 190 can have high strength. Alternatively, the vibration isolator 190 can have the reinforcements 197 on a second side facing the transmitting device 111.

The reinforcements 197 can be arranged in a honeycomb structure. In such an approach, the strength of the vibration isolator 190 can be much increased by the reinforcements 197.

As described above, according to the ultrasonic sensor 180a of the twelfth embodiment, the vibration isolator 190 is reinforced by the reinforcements 197 so that the strength of the vibration isolator 190 can be increased.

The strength of the vibration isolator 190 can be much increased by arranging the reinforcements 197 in a honeycomb structure.

Thirteenth Embodiment

An ultrasonic sensor 180b according to a thirteenth embodiment of the present invention is described below with reference to FIGS. 30A and 30B. Differences between the fourth and thirteenth embodiments are as follows.

Figure 30A:
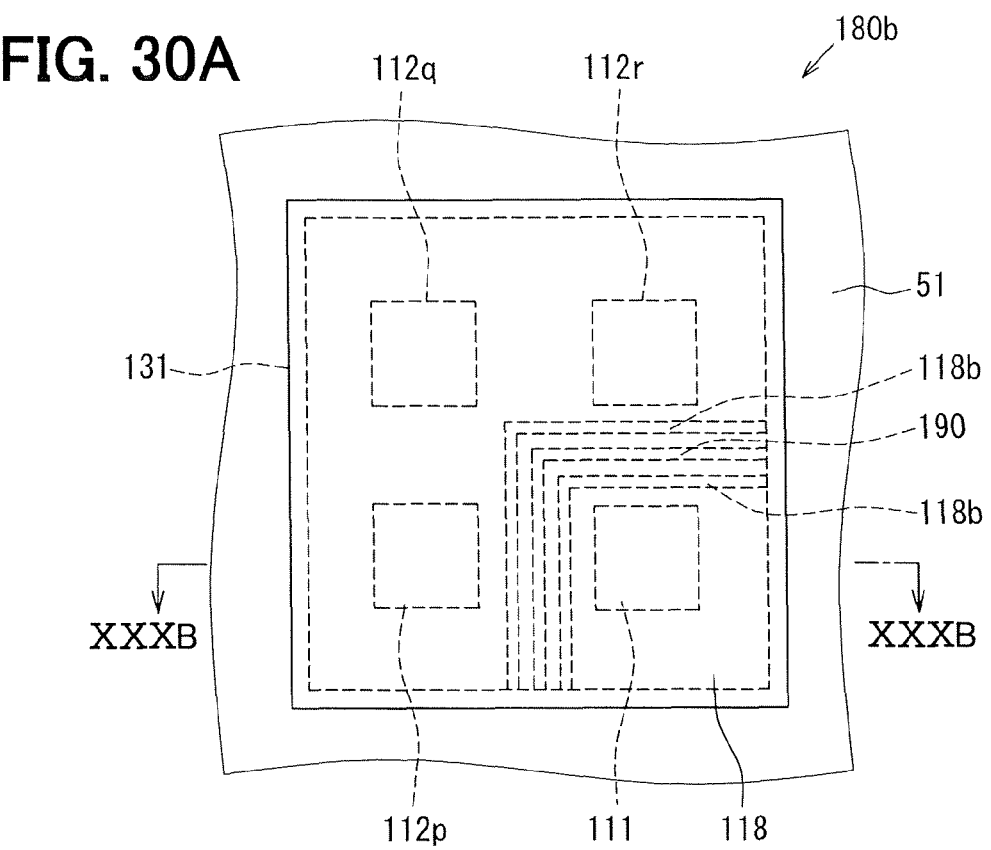
FIG. 30A is a diagram illustrating a top view of an ultrasonic sensor according to a thirteenth embodiment of the present invention.
Figure 30B:
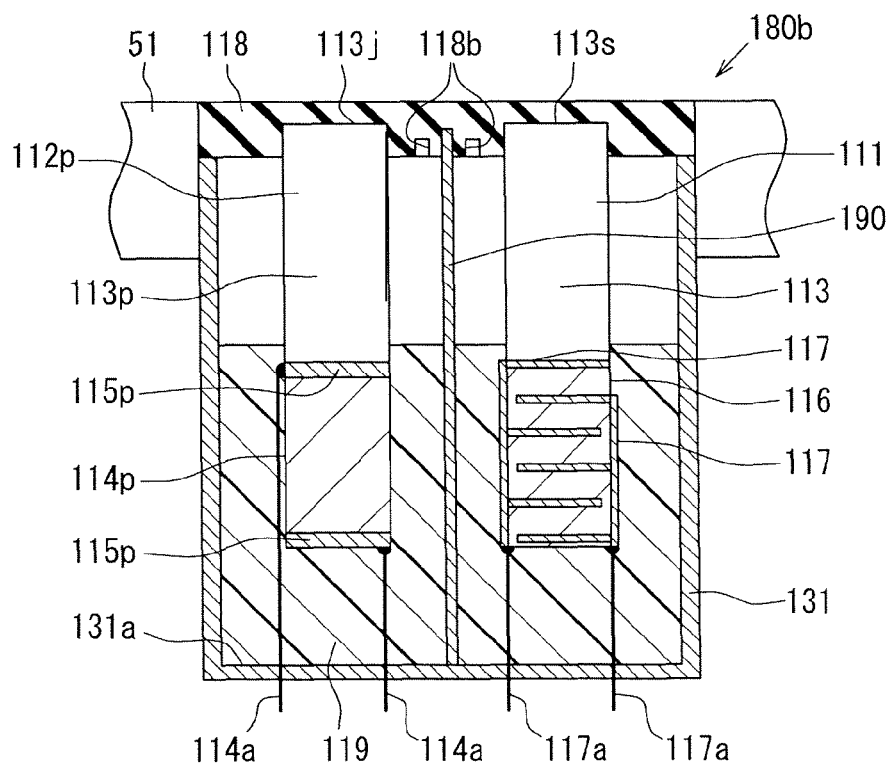
FIG. 30B is a diagram illustrating a cross-sectional view taken along line XXXB-XXXB of FIG. 30A.

As shown in FIGS. 30A and 30B, the vibration damper 118 of the ultrasonic sensor 180b has a slit 118b that is formed on each side of the vibration isolator 190 along the vibration isolator 190. One slit 118b is located between the vibration isolator 190 and the acoustic matching member 113 of the transmitting device 111. The other slit 118b is located between the vibration isolator 190 and the acoustic matching members 113p-113r of the receiving devices 112p-112r.

The vibration from the acoustic matching member 113 of the transmitting device 111 is distributed at the slit 118b. Thus, the slit 118b reduces the propagation of the ultrasonic wave from the transmitting device 111 to the receiving devices 112p-112r. In FIGS. 30A and 30B, the slit 118b is formed on each side of the vibration isolator 190. Alternatively, the slit 118b can be formed on only one side of the vibration isolator 190. Multiple slits 118b can be formed on each side or one side of the vibration isolator 190. In FIGS. 30A and 30B, the slit 118b is formed continuously along the vibration isolator 190. Alternatively, the slit 118b can be formed intermittently along the vibration isolator 190.

As described above, according to the ultrasonic sensor 180b of the thirteenth embodiment, the vibration damper 118 has the slit 118b. The slit 118b is located between the acoustic matching member 113 of the transmitting device 111 and each of the acoustic matching members of the receiving devices 112p-112r. Thus, the propagation of the ultrasonic wave from the transmitting device 111 is distributed at the slit 118b so that the propagation of the ultrasonic wave to the receiving devices 112p-112r can be reduced.

Fourteenth Embodiment

An ultrasonic sensor 180c according to a fourteenth embodiment of the present invention is described below with reference to FIG. 31. Differences between the fourth and fourteen embodiments are as follows.

Figure 31:
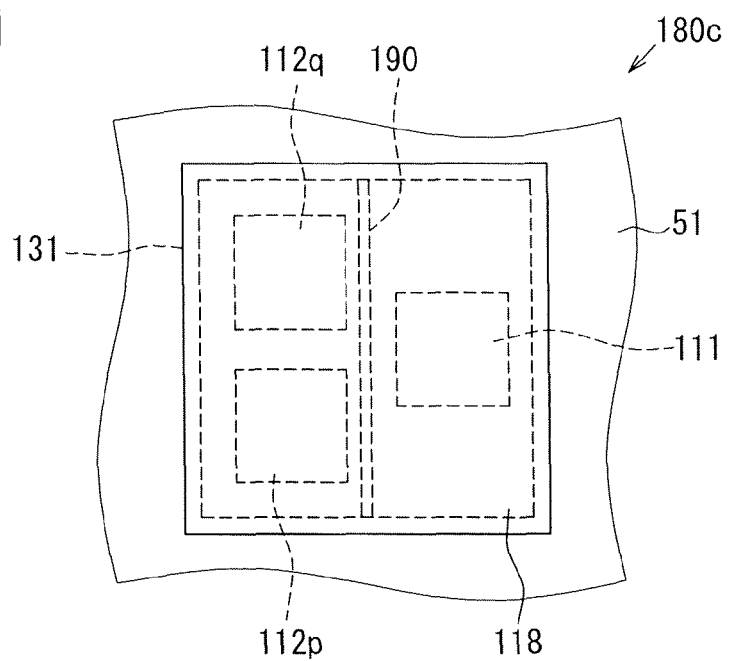
FIG. 31 is a diagram illustrating a top view of an ultrasonic sensor according to a fourteenth embodiment of the present invention.

As shown in FIG. 31, the ultrasonic sensor 180c includes one transmitting device 111 and two receiving devices 112p, 112q. The receiving devices 112p, 112q are arranged such that a distance from the receiving device 112p to the vibration isolator 190 is equal to a distance from the receiving device 112q to the vibration isolator 190. Further, the receiving devices 112p, 112q are arranged such that a distance from the receiving device 112p to the transmitting device 111 is equal to a distance from the receiving device 112q to the transmitting device 111.

In such an approach, the propagation of the ultrasonic wave from the transmitting device 111 to the receiving devices 112p, 112q occurs at the same time. Therefore, influence of the propagation on the receiving devices 112p, 112q can be easily reduced by signal processing.

Figure 32:
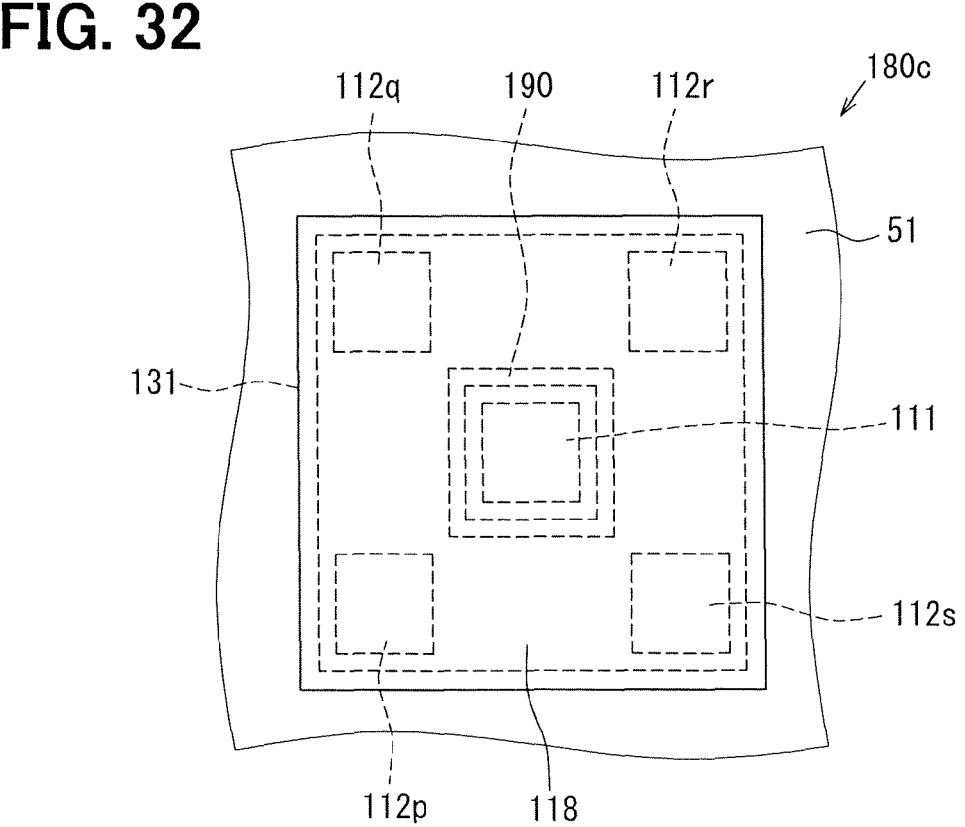
FIG. 32 is a diagram illustrating a top view of an ultrasonic sensor according to a modification of the fourteenth embodiment of the present invention.

The ultrasonic sensor 180c can include three or more receiving devices. For example, as shown in FIG. 32, the ultrasonic sensor 180c can include four receiving devices 112p-112s that are arranged such that a distance from each of the receiving devices 112p-112s to the vibration isolator 190 is the same, and such that a distance from each of the receiving devices 112p-112s to the transmitting device 111 is the same.

Figure 33:
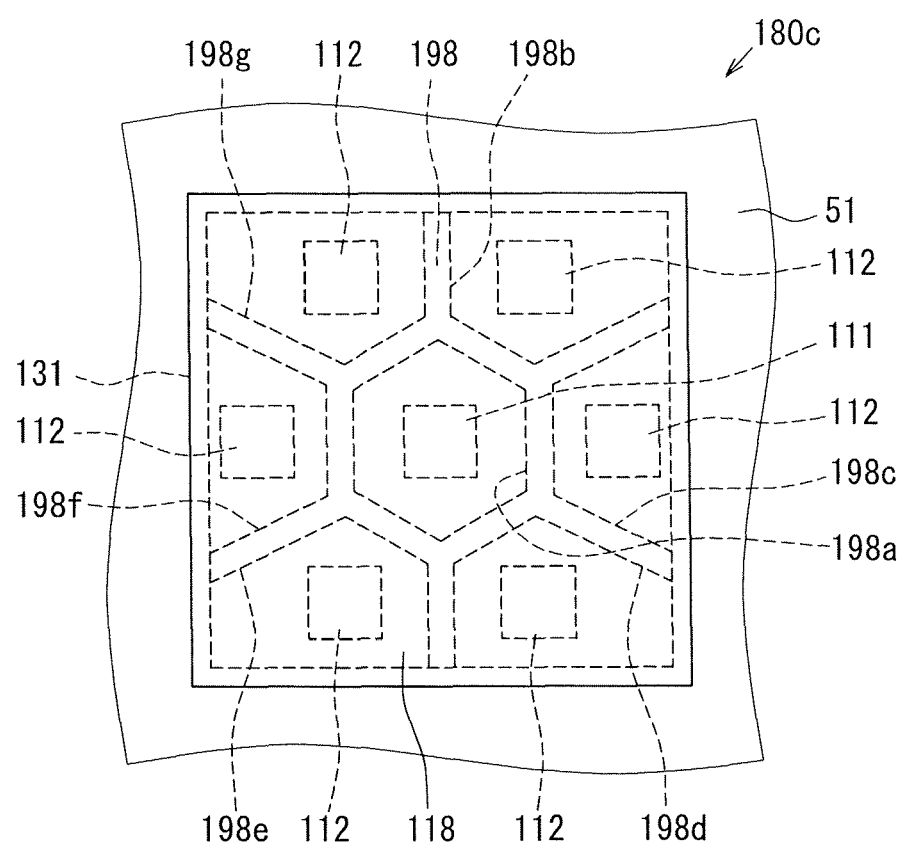
FIG. 33 is a diagram illustrating a top view of an ultrasonic sensor according to another modification of the fourteenth embodiment.

Further, as shown in FIG. 33, the ultrasonic sensor 180c can have a vibration isolator 198 instead of the vibration isolator 190. The vibration isolator 198 has a honeycomb structure to partition the inner space of the housing 131 into multiple spaces 198a-198g. The space 198a is located adjacent to each of the other spaces 198b-198g so that the space 198a can be located in the center of the spaces 198a-198g. The transmitting device 111 is arranged in the center space 198a. Receivers 112 are respectively arranged in the other spaces 198b-198g such that a distance from each receiving device 112 to the transmitting device 111 is the same. Since the vibration isolator 198 has a honeycomb structure, the vibration isolator 198 has high strength.

As described above, according to the ultrasonic sensor 180c of the fourteenth embodiment, the following advantages can be achieved.

(1) The receiving devices are arranged such that the distance from each receiving device to the vibration isolator 190 is the same, and such that the distance from each receiving device to the transmitting device 111 is the same. In such an approach, the propagation of the ultrasonic wave from the transmitting device 111 to the receiving devices occurs at the same time. Therefore, influence of the propagation on the receiving devices can be easily reduced by signal processing.

The ultrasonic sensor 180c can have the vibration isolator 198 instead of the vibration isolator 190. The vibration isolator 198 has a honeycomb structure to partition the inner space of the housing 131 into multiple spaces 198a-198g. The transmitting device 111 is arranged in the center space 198a, and the receiving devices are respectively arranged in the other spaces 198b-198g in such a manner that a distance from each receiving device to the transmitting device 111 is the same. Since the vibration isolator 198 has a honeycomb structure, the vibration isolator 198 has high strength.

Modifications of Embodiments

The embodiments described above can be modified in various ways. For example, the ultrasonic sensors 10-30, 110-180c can be mounted to a portion other than the bumper 51 of the vehicle. The ultrasonic sensors 10-30, 110-180c can be used as an obstacle sensor mounted to a robot.

Such changes and modifications are to be understood as being within the scope of the present invention as defined by the appended claims.

What is claimed is:

1. An ultrasonic sensor for detecting an object, comprising:
a plurality of sensing devices arranged in an array, each of which includes a piezoelectric element and an acoustic matching member having a first surface exposed to space where the object exists and a second surface joined to the piezoelectric element; and
a circuit device electrically coupled to the piezoelectric element, wherein
one of the plurality of sensing devices is configured as a transmitting device that transmits ultrasonic wave upon reception of a transmission signal outputted from the circuit device, and at least another one the plurality of sensing devices is configured as a receiving device that receives the ultrasonic wave reflected from the object and outputs a received signal corresponding to the received ultrasonic wave to the circuit device,
the circuit device includes a drive signal generator that outputs a drive signal to the receiving device based on the transmission signal, and
the drive signal causes the piezoelectric element of the receiving device to vibrate such that a vibration signal propagated from the transmitting device to the receiving device is cancelled.

2. The ultrasonic sensor according to claim 1, wherein
a phase difference between the drive signal and the vibration signal ranges from 110 degrees to 250 degrees.

3. The ultrasonic sensor according to claim 1, wherein
the drive signal comprises a plurality of continuous waves,
the vibration signal comprises a plurality of continuous waves, and
no more than the first two of the plurality of continuous waves of the drive signal are inputted to the receiving device before an initial one of the plurality of continuous waves of the vibration signal propagates to the receiving device.

4. The ultrasonic sensor according to claim 1, wherein
the drive signal comprises a plurality of continuous waves,
the vibration signal comprises a plurality of continuous waves, and
no more than the last two of the plurality of continuous waves of the drive signal are inputted to the receiving device after a last one of the plurality of continuous waves of the vibration signal propagates to the receiving device.

5. The ultrasonic sensor according to claim 1, wherein
the drive signal comprises a plurality of continuous waves,
the vibration signal comprises a plurality of continuous waves, and
the last one of the plurality of continuous waves of the drive signal is inputted to the receiving device when a second last one of the plurality of continuous waves of the vibration signal propagates to the receiving device.

6. The ultrasonic sensor according to claim 1, wherein
a ratio of a magnitude of the drive signal to a magnitude of the vibration signal ranges from 50 percent to 100 percent.

7. The ultrasonic sensor according to claim 1, wherein
the drive signal causes the piezoelectric element of the receiving device to vibrate such that a reverberation vibration of the acoustic matching member propagating to the piezoelectric element of the receiving device is cancelled, and
the propagation of the reverberation vibration to the piezoelectric element of the receiving device follows a propagation of the received ultrasonic wave to the piezoelectric element of the receiving device.

8. An ultrasonic sensor for detecting an object, comprising:
a plurality of sensing devices arranged in an array, each of which includes a piezoelectric element and an acoustic matching member having a first surface exposed to space where the object exists and a second surface joined to the piezoelectric element; and
a circuit device electrically coupled to the piezoelectric element, wherein
a first one of the plurality of sensing devices is configured as a transmitting device that transmits ultrasonic wave upon reception of a transmission signal outputted from the circuit device, and a second one of the plurality of sensing devices is configured as a dummy device that detects only a vibration signal corresponding to a vibration propagating from the transmitting device to the dummy device,
at least another one of the plurality of sensing devices is configured as a receiving device that receives the ultrasonic wave reflected from the object and outputs a received signal corresponding to the received ultrasonic wave to the circuit device, and
the circuit device subtracts the vibration signal from the received signal of the receiving device to cancel a vibration propagated from the transmitting device to the receiving device.

* * * * *